United States Patent [19]
Roach et al.

[11] Patent Number: 5,805,094
[45] Date of Patent: Sep. 8, 1998

[54] ANALOG INTERFACE CIRCUITS FOR PROCESS CONTROLLERS AND PROCESS MONITORS

[75] Inventors: Kevin V. Roach, Carver; James G. Calvin, Halifax, both of Mass.

[73] Assignee: Sensorpulse Corp., Easton, Mass.

[21] Appl. No.: 667,386

[22] Filed: Jun. 21, 1996

Related U.S. Application Data

[63] Continuation-in-part of PCT/US95/04231 Apr. 6, 1995.
[51] Int. Cl.⁶ ...................................................... H03M 1/66
[52] U.S. Cl. ............................................................ 341/144
[58] Field of Search ................................ 341/144, 61, 50, 341/110, 141, 123

[56] References Cited

U.S. PATENT DOCUMENTS 5,038,365  8/1991  Belloc et al. ................................. 375/8
5,170,387  12/1992  Groen ......................................... 369/59

*Primary Examiner*—Brian K. Young
*Attorney, Agent, or Firm*—Wolf, Greenfield & Sacks, P.C.

[57] ABSTRACT

An interface circuit for use with process controllers permits analog signals to be input to a process controller through a binary interface of the process controller and permits analog signals to be output from the process controller through the binary interface. The input analog signal is converted to a digital word of N bits. An identification or end indication and the N bits of the digital word are transmitted to the process controller at a rate selected for compatibility with the scan time of the process controller. The process controller includes a software routine for recognizing the N bits of the digital word. An equivalent approach is used for outputting analog signals through a binary interface of a process controller. The interface circuit can include multiple channels for inputting or outputting multiple analog signals.

32 Claims, 22 Drawing Sheets

ANALOG INTERFACE CIRCUITS FOR PROCESS CONTROLLERS AND PROCESS MONITORS

CROSS REFERENCE TO RELATED APPLICATIONS

This application is a continuation-in-part of pending International Application No. PCT/US95/04231 filed Apr. 6,1995, which claims priority based on U.S. application Serial No. 08/225,234 filed Apr. 8, 1994, now U.S. Pat. No. 5,416,480.

FIELD OF THE INVENTION

This invention relates to interface circuits for process controllers and process monitors and, more particularly, to circuits for inputting analog signals to a process controller through a digital interface and for outputting analog signals from a process controller through a digital interface.

BACKGROUND OF THE INVENTION

Process controllers and process monitors are used in a wide variety of industrial, commercial and scientific applications. A process controller, which may include a microprocessor, receives one or more inputs from sensors and transducers that monitor a process. The process controller evaluates the inputs, determines any necessary action based on user defined criteria and outputs one or more signals for controlling the process. Process controllers may include a digital input card for inputting binary signals which represent the state of a switch, a limit sensor or other device having two states. A digital output card may provide binary output signals for controlling lamps and binary devices which are involved in controlling the process. In other instances, the process controller receives and transmits binary signals through a digital interface without separate input and output cards. A process monitor receives inputs from sensors and transducers but does not provide outputs for controlling the process.

In many cases, it is necessary to input analog signals to the process controller or process monitor in order to monitor continuously variable parameters, such as temperature, fluid level, pressure, pH, conductivity and the like. It may also be necessary to output analog signals for controlling such continuously variable parameters. Some process controllers can be used with optional analog interface cards. Analog interface cards typically handle four or more analog inputs or outputs and may have additional features, such as digital filtering and scaling of the analog signals. Such analog interface cards provide satisfactory performance, but are relatively expensive. The expense of an analog interface card is particularly undesirable when only one or two analog inputs are required and when the additional features of the typical analog interface card are not required.

Other process controllers do not provide analog input and output capability and operate with only binary inputs and outputs. It has not heretofore been possible to input analog signals to such process controllers or to output analog signals from such process controllers.

The input or output analog signal in a process control application may represent a slowly-varying parameter, such as temperature or fluid level, wherein significant changes occur in times on the order of seconds, minutes or longer. In prior art systems, it has been necessary to incur the expense of an analog interface card in order to monitor such slowly-varying parameters. It is desirable to provide an interface circuit for inputting an analog signal to a process controller or a process monitor without incurring the expense of a high performance analog input card. It is also desirable to provide an interface circuit for outputting an analog signal from a process controller without incurring the expense of a high performance analog output card.

SUMMARY OF THE INVENTION

According to a first aspect of the invention, methods and apparatus are provided for transmitting analog values from process apparatus having a binary interface to an interface circuit. A signal transmitted by the process apparatus to the interface circuit includes an identification followed by a digital word of N bits representative of an analog value. The interface circuit comprises means for receiving the identification followed by the digital word of N bits and means for converting the N bits of the digital word to the analog value. Each of the N bits of the digital word is transmitted as a sequence comprising a first constant value having a period of at least X, where X represents the scan time of the process apparatus for changing output values at the binary interface, followed by a data bit having a period of at least 3X followed by a second constant value having a period of at least X. The interface circuit extracts the data bit from the sequence for each of the N bits. In a preferred embodiment, the first constant value comprises an on state and the second constant value comprises an off state. The identification preferably comprises an off state having a period of at least 5X followed by an on state having a period of at least 3X followed by the off state having a period of at least 5X. This configuration may be used for transmitting digital words representative of one or more analog signals. When the digital words represent more than one analog signal, the digital words may be time multiplexed on a single line of the binary interface or may be transmitted on separate lines of the binary interface.

According to a second aspect of the invention, methods and apparatus are provided for transmitting analog values to and between an interface circuit and process apparatus in a high speed counter mode. An interface circuit for inputting an analog signal to the process apparatus in the high speed counter mode comprises means for converting a value of the analog signal to a digital word comprising P pulses, where P is a number that represents the value of the analog signal, and means for serially transmitting to the process apparatus on a single line of a binary interface the P pulses of the digital word followed by an end indication. The process apparatus includes means for counting pulses received at the binary interface. The process apparatus counts the P pulses of the digital word to determine the value of the analog signal. Preferably, the P pulses of the digital word transmitted to the process apparatus include a constant number of pulses and a variable number of pulses. The variable number of pulses represents the value of the analog signal. The end indication preferably comprises an off state having a period of at least 2X, where X represents the scan time of the process apparatus for sampling inputs at the binary interface. Analog values may be transmitted from the interface circuit to the process apparatus or from the process apparatus to the interface circuit in the high speed counter mode.

According to a third aspect of the invention, methods and apparatus are provided for transmitting analog values to and between an interface circuit and process apparatus in a binary weighted counter mode. An interface circuit for inputting an analog signal the process apparatus having a binary interface in the binary weighted counter mode comprises means for converting a value of the analog signal to a digital word of N bits, and means for serially transmitting to the process apparatus on a single line of the binary interface an identification followed by the N bits of the digital word. The process apparatus has a scan time X for sampling inputs at the binary interface and includes means for counting pulses received at the binary interface. Each of the N bits of the digital word is transmitted as a sequence comprising a number of pulses representative of a binary state of the data bit followed by an off state having a period of at least 2X. The process apparatus counts the pulses representative of the binary state of each data bit in the digital word to determine the value of the analog signal. Preferably, the sequence comprises one pulse representative of a first binary state or two pulses representative of a second binary state. The identification preferably comprises at least three pulses followed by an off state having a period of at least 2X. Analog values may be transmitted from the interface circuit to the process apparatus or from the process apparatus to the interface circuit in the binary weighted counter mode. This configuration may be used for transmitting digital words representative of one or more analog signals. When the digital words represent more than one analog signal, the digital words may be time multiplexed on a single line of the binary interface or may be transmitted on separate lines of the binary interface.

According to a fourth aspect of the invention, methods and apparatus are provided for transmitting analog values to and between an interface circuit and process apparatus in a delta mode. An interface circuit for inputting an analog signal to process apparatus having a binary interface in the delta mode comprises means for determining a difference between a current value of the analog signal and a previous value of the analog signal, means for converting the difference to a delta digital word of M bits when the difference is less than a threshold limit, means for converting the current value of the analog signal to a full digital word of N bits when the difference is equal to or greater than the threshold limit, and means for transmitting to the process apparatus on a single line of the binary interface an identification followed by an indication of the delta digital word or the full digital word followed by the M bits of the delta digital word or the N bits of the full digital word. The process apparatus adds the difference represented by the M bits of the delta digital word to the previous value of the analog signal to determine the current value of the analog signal in response to an indication of the delta digital word and processes the N bits of the full digital word as representative of the current value of the analog signal in response to an indication of the full digital word. The delta mode may be utilized for transmitting analog values from the interface circuit to the process controller or for transmitting analog values from the process controller to the interface circuit. The delta mode may be utilized with any of the formats which include an identification. This configuration may be used for transmitting digital words representative of one or more analog signals. When the digital words represent more than one analog signal, the digital words may be time multiplexed on a single line of the binary interface or may be transmitted on separate lines of the binary interface.

BRIEF DESCRIPTION OF THE DRAWINGS

For a better understanding of the present invention, reference is made to the accompanying drawings which are incorporated herein by reference and in which.

DETAILED DESCRIPTION

Figure 1:
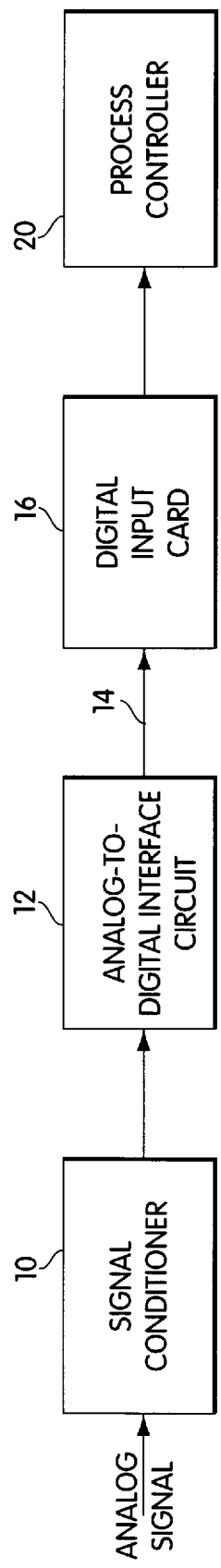
FIG. 1 is a block diagram of a process control system incorporating a single channel interface circuit for inputting an analog signal to a process controller.

A block diagram of a process control system incorporating a first embodiment of the present invention is shown in FIG. 1. An analog signal from a signal source, such as a transducer, is supplied through an optional signal conditioner 10 to an analog-to-digital interface circuit 12. The interface circuit 12 samples the analog signal at a prescribed rate and serially transmits data words on a single line 14 to a digital input card 16. Each data word transmitted by the interface circuit includes an identification (ID) pulse and a digital sample of N bits, and may include additional information such as a sign bit and an overrange bit. The N bits of the digital sample represent a sample value of the analog signal. The digital input card 16 forwards a stream of data words representative of the analog signal to a process controller 20. The transmission from the interface circuit 12 to the process controller is completely asynchronous in that these circuits run on separate clocks. Furthermore, process controller 20 does not acknowledge receipt of the data words from the interface circuit 12.

The input analog signal is typically received from a transducer such as a resistance thermal detector (RTD), a thermocouple temperature sensor, a vibration transducer, a fluid level transducer, a flow transducer, a pressure transducer, a pH transducer, a conductivity transducer, a power level transducer, a humidity transducer, a speed transducer, a position transducer, or any other transducer. In general, the analog signal can be obtained from any analog source.

The interface circuit 12 is capable of serially transmitting data words to the process controller 20 at high speed. However, the interface circuit 12 may be limited to slower data transmission rates, and may thus be limited to slowly-varying analog signals, because of limitations in the process controller 20. More specifically, the data transmission rate is limited by the maximum scan time of the process controller 20. The scan time defines the intervals at which the process controller senses the binary value present on a specified input line and is a function of the software being executed by the process controller.

The signal conditioner 10 permits the interface circuit 12 to accommodate a variety of input analog signals. The signal conditioner 10 may convert the voltage range and impedance of the input analog signal to values that are compatible with the interface circuit 12. For example, the input analog signal may require scaling, level shifting and/or filtering. Nonlinear signals, such as thermocouple signals and RTD signals, may require linearization. As described below, the interface circuit 12 may perform linearization. The signal conditioner 10 may not be required, when the analog signal from the transducer is compatible with the input to the interface circuit 12. Details of the signal conditioner 10 are outside the scope of the present invention and will not be described further.

The digital input card 16 is typically used for inputting binary signals to the process controller 20. Examples of such inputs include switch closures, limit sensor outputs, and the like, which are in one of two states. A typical digital input card 16 may include 16 input lines. However, the present invention requires only one input line per analog signal. In some cases, digital samples representative of two or more analog signals may be transmitted serially on a single input line in a time-multiplexed manner.

The process controller 20 typically includes a microprocessor which performs all necessary operations in the process control system. Examples of process controllers include Models PLC5 and SLC500, available from Allen Bradley. The process controller 20 receives inputs from the digital input card 16 at intervals that depend on the software being executed by the process controller 20. The process controller 20 scans the inputs from the digital input card 16 at intervals known as the scan time and processes the inputs as required. The scan time typically has a value on the order of about 10 milliseconds, but in some cases may be longer depending on the software being executed by the process controller 20. Binary inputs supplied to the process controller 20 through digital input card 16 must be present for a sufficient time to insure recognition by the process controller 20, with an acceptable error rate. In cases where the scan time is excessively long, it may be necessary to use the selectable time interrupt available in some process controllers in order to receive inputs from the interface circuit 12 more frequently. As described below, the timing parameters of the data words transmitted from the interface circuit 12 to the process controller 20 are selected for compatibility with the average scan time of the process controller.

Process controller 20 includes a software routine for scanning the specified input line of the digital input card 16 at a rate determined by the scan time, and for recognizing and handling each of the data words received from the interface circuit 12. The software routine recognizes the identification pulse as the start of a data word and reads the following N bits of the digital sample. Typically, the bits of the digital sample are assembled in a register and then loaded into memory for processing by other routines in the process controller 20. The software routine is described in detail below.

Figure 2:
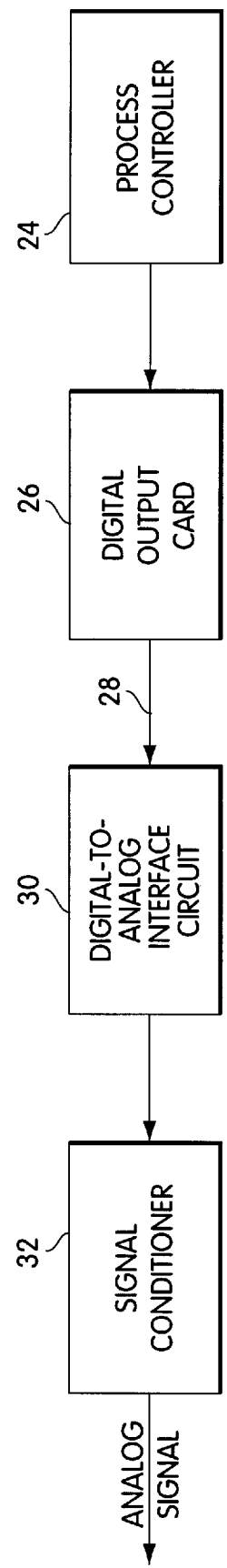
FIG. 2 is a block diagram of a process control system incorporating a single channel interface circuit for outputting an analog signal from a process controller.

A block diagram of a process control system incorporating a second embodiment of the present invention is shown at FIG. 2. In the embodiment of FIG. 2, a process controller 24 outputs an analog signal through a digital output card 26 or other binary interface. The process controller 24 forwards a stream of data words to the digital output card 26. Each data word includes a digital sample of N bits representative of a value of an analog signal, and an identification pulse. The process controller 24 includes a software routine for transmitting the stream of data words on a specified line of the digital output card 26 with specified timing parameters. The data words are transmitted serially on a single line 28 to a digital-to-analog interface circuit 30. The interface circuit 30 recognizes the identification pulse and converts the N bits of the digital sample to an analog value. The analog values are supplied to a signal conditioner 32 which may include scaling, level shifting and/or filtering of the signal. The signal conditioner 32 supplies an analog output signal for control of a process.

Figure 3:
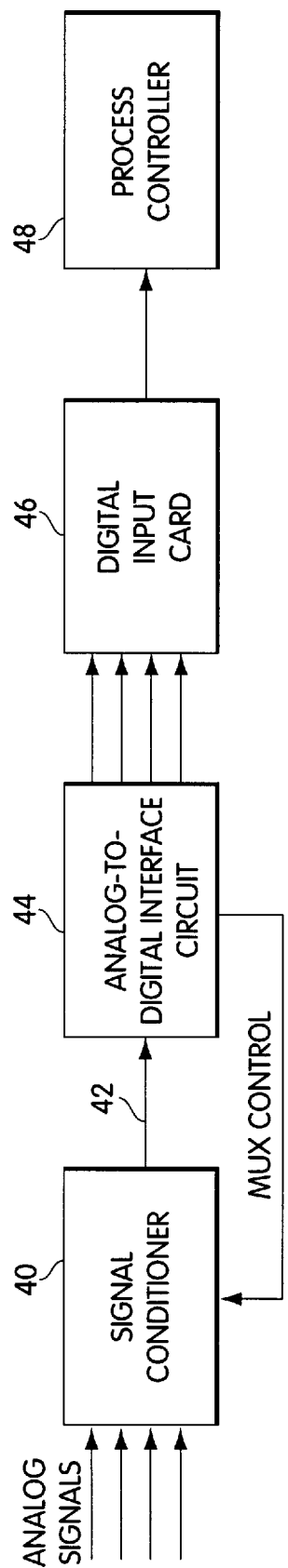
FIGS. 3 and 3A are block diagrams of process control systems incorporating a four channel interface circuit for inputting analog signals to a process controller.

A block diagram of a process control system incorporating a third embodiment of the present invention is shown in FIG. 3. The embodiment of FIG. 3 is similar to the embodiment of FIG. 1, but includes two or more channels for inputting analog signals to a process controller through a digital input card. A four channel system is illustrated in the example of FIG. 3. Four analog signals are input to a signal conditioner 40 which performs scaling, level shifting and/or filtering of each input analog signal. In addition, the signal conditioner 40 includes an analog multiplexer which sequentially outputs the four analog input signals on a line 42 to an analog-to-digital interface circuit 44. The interface circuit 44 supplies a multiplexer control signal to the signal conditioner 40 for sequentially selecting the analog signals. The interface circuit 44 sequentially samples each analog input signal. The digital samples of the analog signals are temporarily stored by the interface circuit. The interface circuit 44 has four outputs, one corresponding to each of the analog input signals. Each output of the interface circuit 44 is a stream of data words, each including an identification pulse and one of the stored digital samples. The data words may be transmitted on separate lines, one corresponding to each analog signal, of a digital input card 46 to a process controller 48. The process controller 48 scans the input lines of the digital input card 46 and receives the data words representative of the corresponding analog input signals. The process controller 48 includes a software routine, as described below, for recognizing the identification pulse and handling the digital sample which follows the identification pulse.

Figure 3A:
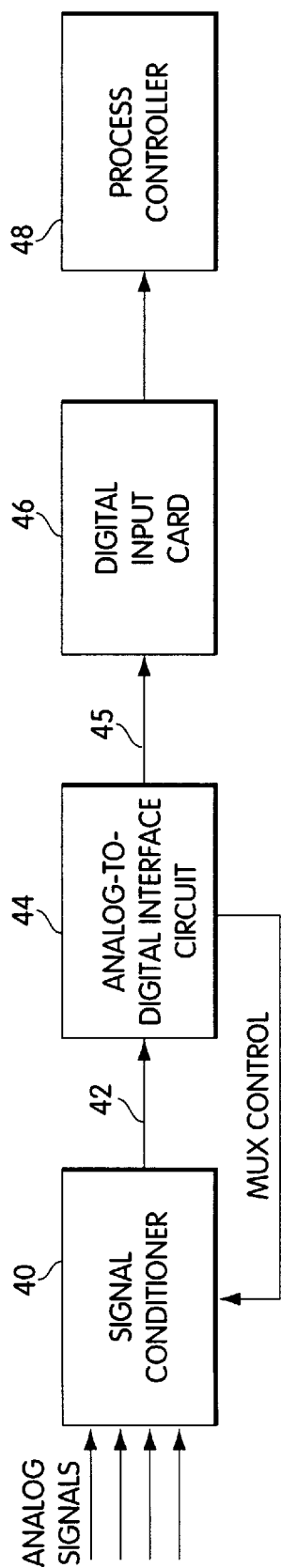

A variation of the embodiment of FIG. 3 is shown in FIG. 3A. Like elements in FIGS. 3 and 3A have the same reference numerals. Data words representative of two or more analog signals may be transmitted serially by the interface circuit 44 to the process controller 48 on a single line 45 of the digital input card 46 in a time-multiplexed manner. A data word representative of a first analog signal is followed by a data word representative of a second analog signal, and so on. As more analog signals are time-multiplexed on a single line, the update time for each analog signals is increased.

Figure 4:
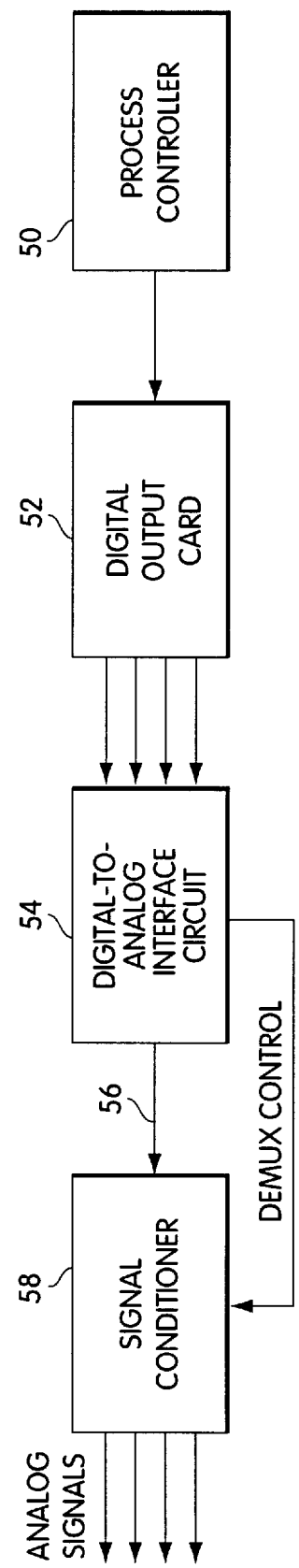
FIGS. 4 and 4A are block diagrams of process control systems incorporating a four channel interface circuit for outputting analog signals from a process controller.

A block diagram of a process control system incorporating a fourth embodiment of the present invention is shown in FIG. 4. The embodiment of FIG. 4 is similar to the control system of FIG. 2, but includes two or more channels for outputting analog signals from a process controller 50 through a digital output card 52. A four channel system is illustrated in the example of FIG. 4. The process controller 50 may transmit a stream of data words on each of four output lines of the digital output card 52. Each data word includes an identification pulse and a digital sample of N bits representative of a value of an analog signal. The data words are input to a digital-to-analog interface circuit 54 which recognizes each identification pulse and temporarily stores the associated digital sample. The digital samples are converted by the interface circuit 54 to analog values representative of four analog signals. The analog values are supplied in a time multiplexed manner on a line 56 to a signal conditioner 58. The signal conditioner 58 includes a sample-and-hold circuit for each analog signal for storing the analog value of the corresponding analog signal. The analog values on line 56 are supplied to the corresponding sample-and-hold circuit under control of a demultiplex signal from interface circuit 54. The signal conditioner 58 also includes circuitry for scaling, level shifting and/or filtering of each analog output signal.

Figure 4A:
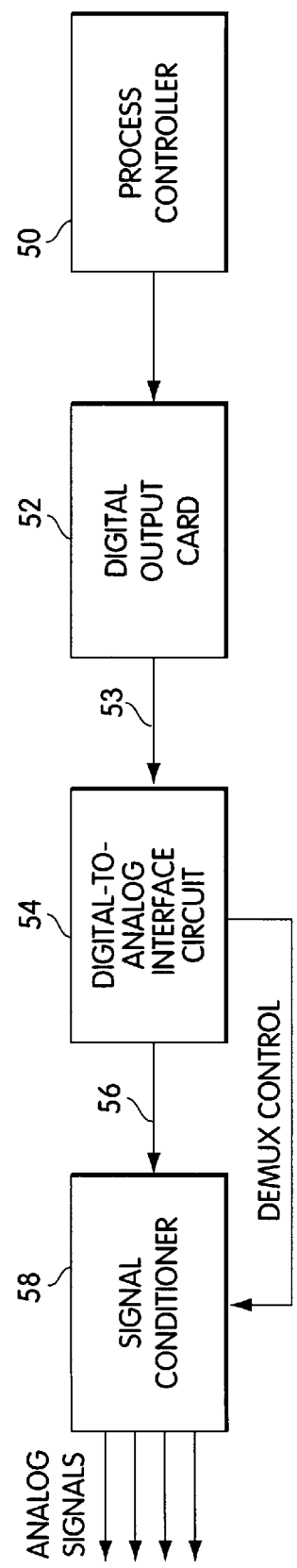

A variation of the embodiment of FIG. 4 is shown in FIG. 4A. Like elements in FIGS. 4 and 4A have the same reference numerals. Data words representative of two or more analog signals may be transmitted serially by the process controller 50 to the interface circuit 54 on a single line 53 of the digital output card 52. A data word representative of a first analog signal is followed by a data word representative of a second analog signal, and so on.

The process control systems shown in FIGS. 1–4 and described above have several common features. In each case, digitized values of analog signals are input to a process controller or output from a process controller as a stream of data words. Each data word includes an identification pulse and a digital sample of N bits. As described below, the transmitted values may also include a sign bit and an overrange bit. The identification pulse and the N bits of the digital sample are transmitted through a digital input or output card that is normally intended for receiving or transmitting binary signals, such as switch closures, lamp control signals and the like. In each case, the interface circuit and the process controller operate asynchronously. The identification pulse permits the following digital sample to be recognized, without transmission of synchronizing signals, acknowledgments or the like. As described below, the timing of the identification pulse and the bits of the digital sample is selected for compatibility with the maximum scan time of the process controller.

The process control systems shown in FIGS. 1–4 and described above utilize a digital input card for input of binary information and a digital output card for output of binary information. Some process controllers simply have input/output terminals for inputting and outputting binary information. Each of the input/output cards and the input/output terminals functions as a binary interface for transfer of binary information to or from the process controller. The present invention can be utilized with any process controller that has a binary interface for transfer of binary information to or from the process controller. Furthermore, the present invention is not limited to use with process controllers. More generally, the present invention may be utilized with any process apparatus, including process controllers and process monitors. Finally, the multiple channel embodiments shown in FIGS. 3, 3A, 4 and 4A can have any desired number of channels.

Figure 5:
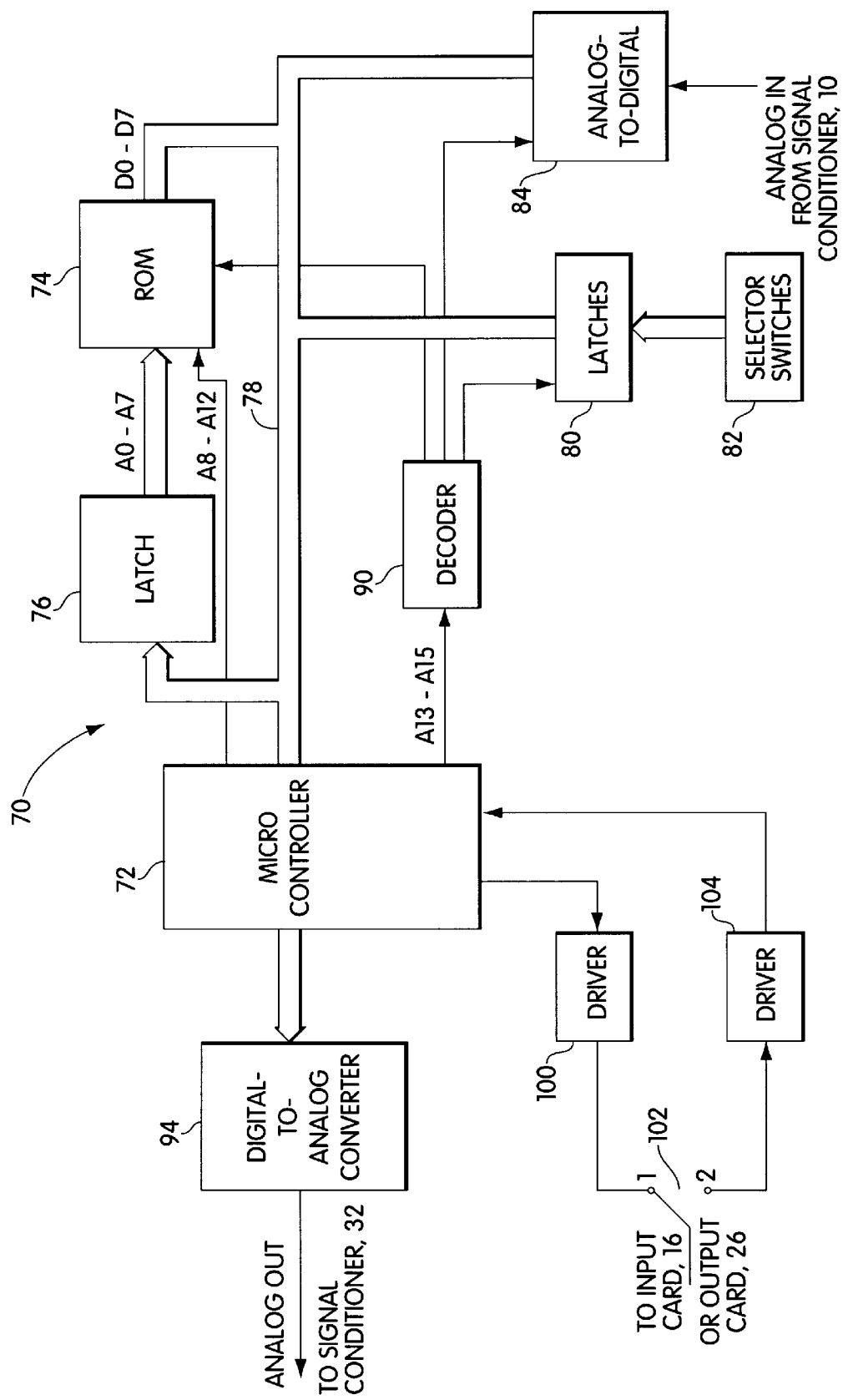
FIG. 5 is a block diagram of a single channel interface circuit.

A block diagram of a suitable implementation of the single channel interface circuit is shown in FIG. 5. The interface circuit of FIG. 5 can be used to implement both the analog digital interface 12 shown in FIG. 1 and the digital-to-analog interface circuit 30 shown in FIG. 2, with the modifications described below. A processor 70 for controlling operations of the interface circuit includes a microcontroller 72, a read only memory (ROM) 74 and an address latch 76. In a preferred embodiment, the microcontroller 72 comprises an Intel 8032 microcontroller, and the ROM 74 contains 8K bytes for storage of the interface circuit program. An address and data bus 78 of microcontroller 72 is connected to the input of latch 76 and to the output of ROM 74. The ROM 74 receives upper order address bits directly from microcontroller 72 and lower order address bits from latch 76. The data outputs of ROM 74 are supplied on bus 78 to the microcontroller 72.

Also connected to bus 78 are latches 80, which receive inputs from selector switches 82. The selector switches 82 permit user selection of the timing parameters of the data word. In addition, the selector switches 82 permit identification of transducer type and selection of any other desired parameters.

An analog-to-digital converter 84 is utilized when the interface circuit is configured to input digital samples of an analog signal to the process controller. The analog-to-digital converter 84 receives an analog input signal from the signal conditioner 10 (FIG. 1) and has its data outputs connected to bus 78. The analog-to-digital converter 84 can, for example, be a type 7109 manufactured by Teledyne. A decoder 90 receives upper address bits from microcontroller 72 and supplies enable signals to ROM 74, latches 80 and analog-to-digital converter 84.

The microcontroller 72 supplies inputs into a digital-to-analog converter 94 on programmed I/O lines of the microcontroller 72. The digital-to-analog converter 94 is utilized only when the interface circuit is configured to receive digital samples of an analog signal from the process controller. The output of digital-to-analog converter 94 is connected to the signal conditioner 32 (FIG. 2).

The microcontroller 72 supplies data words to the digital input card 16 through a driver 100 and a selector switch 102. The microcontroller 72 receives data words from the digital output card 26 through switch 102 and the driver 104. The drivers 102 and 104 are preferably optical isolators. The switch 102 permits the process controller to be selectively connected to driver 100 or driver 104. The process controller is connected through digital input card 16 to driver 100 when the interface circuit is configured to input digital samples of an analog signal to the process controller. The process controller is connected through digital output card 26 to driver 104 when the interface circuit is configured to receive digital samples of an analog signal from the process controller.

When the interface circuit of FIG. 5 is configured to input digital samples to the process controller, the analog-to-digital converter 84 is installed in the circuit, and the switch 102 is placed in position 1 to connect the output of driver 100 to the digital input card 16. The interface circuit transmits a stream of data words, including identification pulses followed by digital samples, to the process controller at a rate determined by the selector switches. When the interface circuit is configured to receive digital samples from the process controller, the digital-to-analog converter 94 is installed in the circuit, and the switch 102 is placed in position 2 to connect the input of driver 104 to the digital output card 26. The interface circuit receives a stream of data words at a rate determined by the process controller. The selector switches 82 are set to match the data rate of the data words received from the process controller.

The firmware in ROM 74 for controlling the operation of the interface circuit includes three primary functions. An initialization routine reads the value of the selector switches 82 and establishes the required timing and other variable parameters. A data acquisition and value manipulation routine controls the analog-to-digital convertor 84, stores the output of the analog-to-digital convertor 84, and linearizes the analog signal if necessary. When the interface circuit of FIG. 5 is configured to input digital samples to the process controller, a data transmission routine controls serial transmission of the stored data words to the process controller, with the timing established by the selector switches 82. When the interface circuit is configured to receive digital samples from the process controller, a data input routine recognizes the identification pulse and each data bit, and stores the received data. These software routines are described in detail below.

Figure 6:
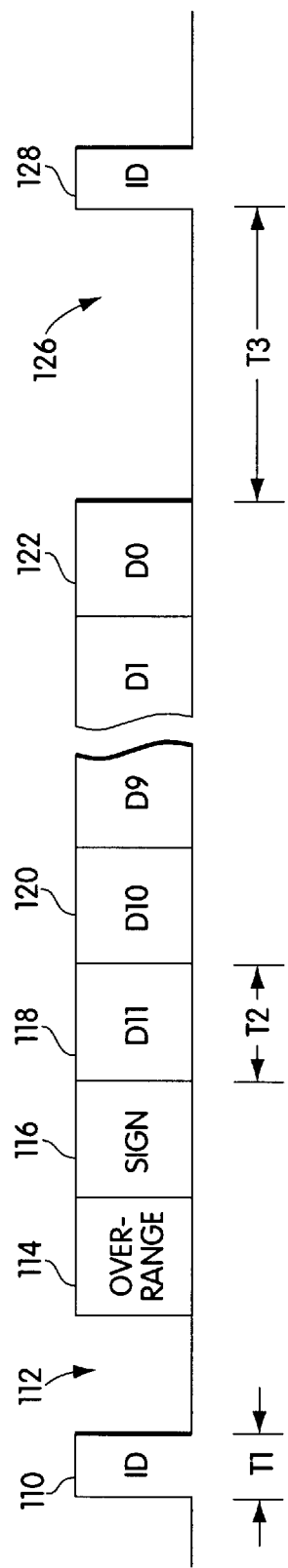
FIG. 6 is a timing diagram showing a format for data transmission.

A timing diagram showing the format of the data words transmitted by the interface circuit or received by the interface circuit is shown in FIG. 6. Each data word includes an identification pulse 110 followed by a zero 112, an optional overrange bit 114, an optional sign bit 116 and 12 data bits 118, 120 . . . 122 of the digital sample. More generally, the digital sample includes N Bits and may include a sign bit and a overrange bit. The last data bit 122 is followed by timeout period 126. The timeout period is terminated by an identification pulse 128 for the next data word. The important timing parameters of the data word are the period T1 of the identification pulse, the period T2 of each data bit and the timeout period T3.

The timing periods T1, T2 and T3 are selected based on the maximum scan time of process controller. The scan time specifies the rate at which the process controller inputs or outputs binary information on a specified interface line. Thus, for example, when the scan time is 10 milliseconds, the process controller reads a specified input line of the digital input card 16 on the average of every 10 milliseconds. The timing periods T1, T2 and T3 are established as follows. The period T1 of the identification pulse is at least two times the scan time. Preferably, the period T1 is three or more times the scan time of the process controller. The period T2 of each of the data bits of the digital sample is longer than the period T1 of the identification pulse by a sufficient amount that the identification pulse can be distinguished from the data bits. This permits the start of a data word to be recognized. The period T2 is at least four times and preferably five or more times the scan time. In a preferred embodiment, the period T1 of the identification pulse is 3X, and the period T2 of each of the data bits is 5X, where X represents the scan time of the process controller. The timeout period T3 establishes the time between data words and may be in a range of 30 milliseconds to 100 milliseconds. The timing period T1, T2 and T3 are established by selector switches 82 (FIG. 5) based on a knowledge of the scan time of the process controller in a particular application. In a typical application, the scan time X is 10 milliseconds, T1 is 30 milliseconds, T2 is 50 milliseconds and T3 is 50 milliseconds, for a total cycle time of 0.86 seconds.

Figure 7:
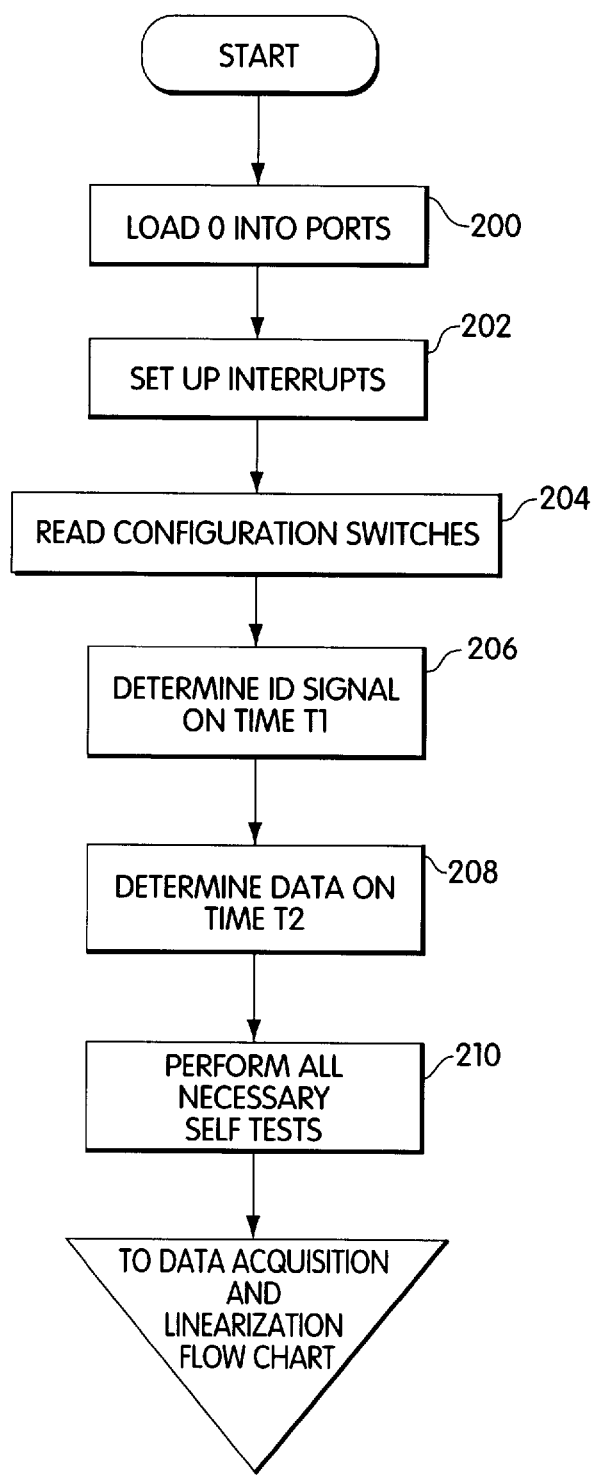
FIG. 7 is a flow diagram that illustrates the initialization routine executed by the microcontroller of FIG. 5.

A flowchart of the initialization routine executed by the microcontroller 72 is illustrated in FIG. 7. After microcontroller initialization steps 200 and 202, the selector switches 82 (FIG. 5) are read in step 204. From the selector switch settings, the period T1 of the identification pulse is determined in step 206, and the period T2 of each bit of the digital sample is determined in step 208. Self tests are performed in step 210.

Figure 8:
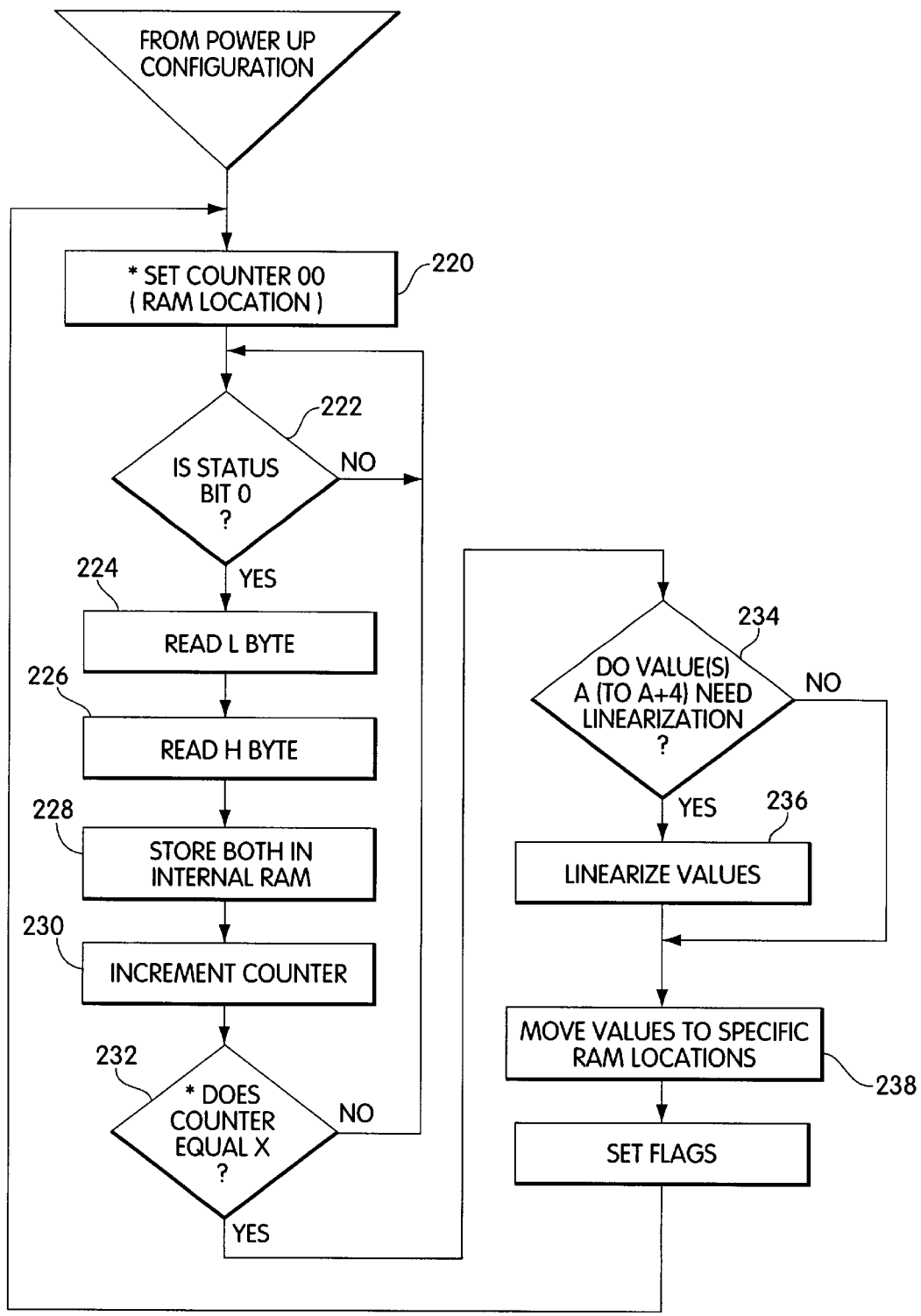
FIG. 8 is a flow diagram that illustrates the data acquisition and value manipulation routine executed by the microcontroller of FIG. 5.

A flowchart of the data acquisition and value manipulation routine executed by the microcontroller 72 is shown in FIG. 8. If the interface circuit has more than one channel, a software channel counter is set in step 220. The counter represents the channel being processed. A status bit indicative of the presence of data in analog-to-digital converter 84 is checked in step 222. When data is present in the analog-to-digital converter 84, the low byte is read in step 224, and the high byte is read in step 226. The high and low bytes from the analog-to-digital converter 84 are stored in the internal RAM of microcontroller 72 in step 228. The channel counter is incremented in step 230. If the channel counter has not reached the number of channels in the system (step 232), steps 222–230 are repeated until values for all channels have been read and stored. If the stored values are determined in step 234 to require linearization, the values are linearized in step 236, and the linearized values are moved to specified RAM locations in step 238.

Figure 9:
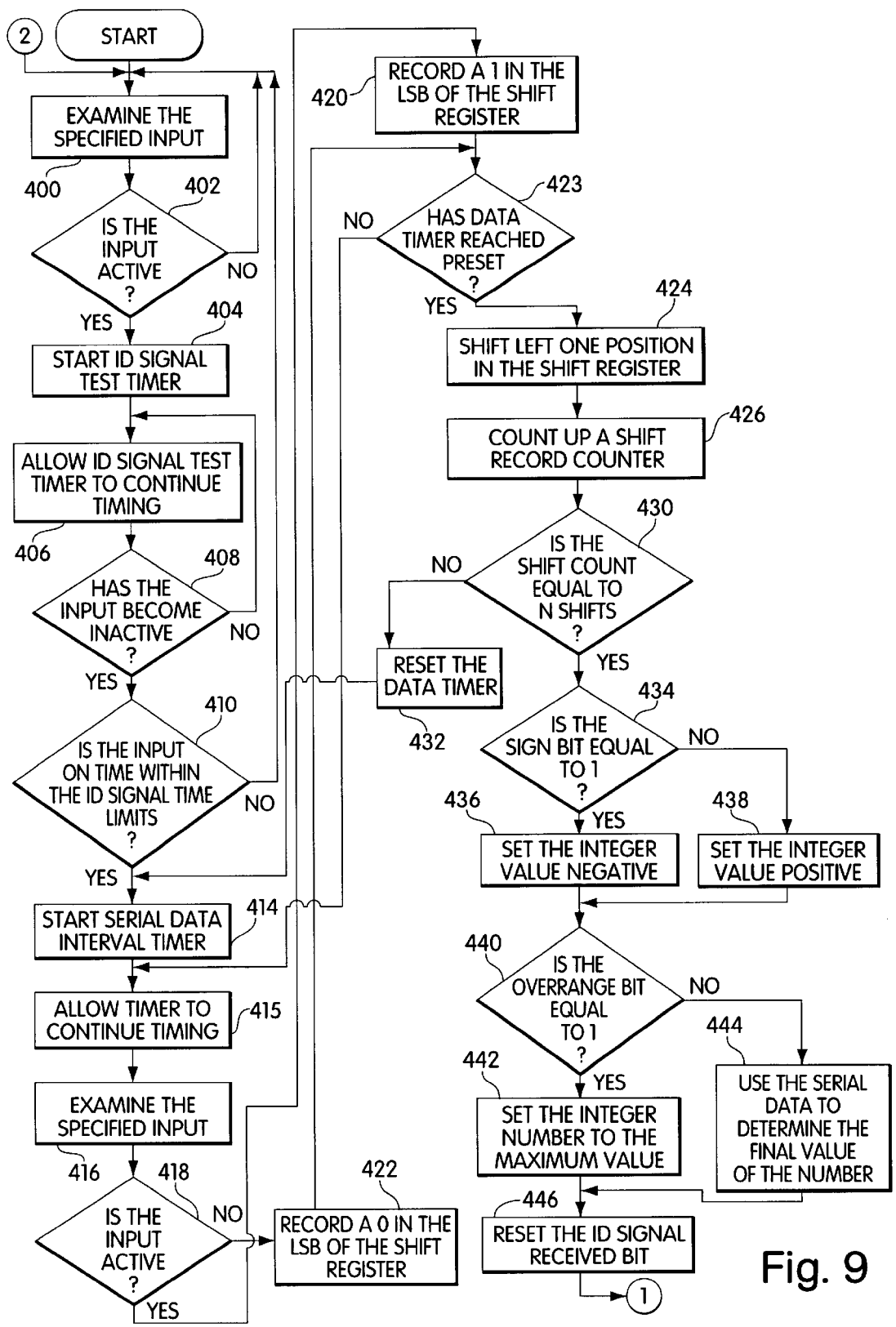
FIG. 9 is a flow diagram that illustrates the routine executed by the process controller for receiving serial data from the interface circuit or executed by microcontroller of FIG. 5 for receiving serial data from the process controller.

A flowchart of the software routine in the process controller 20 for recognizing and handling data words received from the interface circuit is shown in FIG. 9. A similar software routine is executed by the interface circuit when it is configured to receive digital samples from the process controller. In step 400, the specified input line for receiving data words is examined. The routine which begins with step 400 is initiated at intervals corresponding to the scan time of the process controller. If the input is determined to be active in step 402, an identification pulse timer is started in step 404. The timer continues timing in step 406 until the specified input becomes inactive, as determined in step 408.

When the specified input becomes inactive, the timer is stopped, and pulse width of the ID pulse is compared with upper and lower limits in step 410. Typically, the upper limit is the normal ID pulse width plus the scan time, and the lower limit is the normal ID pulse width minus the scan time. Thus, for example, when the normal ID pulse width T1 is 30 milliseconds and the scan time is 10 milliseconds, the process controller recognizes a pulse in the range of 20 milliseconds to 40 milliseconds as an ID pulse. The upper and lower limits for recognizing an ID pulse are required because the start of the ID pulse is asynchronous with the scanning of the specified input line by the process controller. Data bits are not recognized as an ID pulse because they have a pulse width that is greater than the upper limit for an ID pulse. When the ID pulse is not within the specified time limits, as determined in step 410, the routine is reset and any following data bits are ignored.

Assuming that the ID pulse is within specified time limits, a data timer is started in step 414, the data timer is allowed to continue timing in step 415 and the specified input is examined in step 416. When the input is determined to be active in step 418, a one is recorded in the least significant bit of a shift register in step 420. When the input is not active, a zero is recorded in the least significant bit of the shift register in step 422. The data timer is compared with the preset value in step 423. When the data timer has not reached the preset value, the routine returns to step 415 and allows the timer to continue timing. When the data timer has reached the preset value, the active position in the shift register is shifted left by one position in step 424, and a shift record counter is incremented in step 426.

When the shift count is determined in step 430 to be less than N, the data timer is reset in step 432 and the recording of data bits is repeated until the N bits of the digital sample have been received. When the shift count reaches N, a sign bit is tested in step 434 and the sign of the digital sample is set appropriately in step 436 or 438. The overrange bit is tested in step 440. When the overrange bit is set, the integer value of the digital sample is set to the value in step 442. When the overrange bit is not set, the N bits stored in the shift register are established as the integer value of the digital sample in step 444. The ID pulse received bit is reset in step 446.

Figure 10:
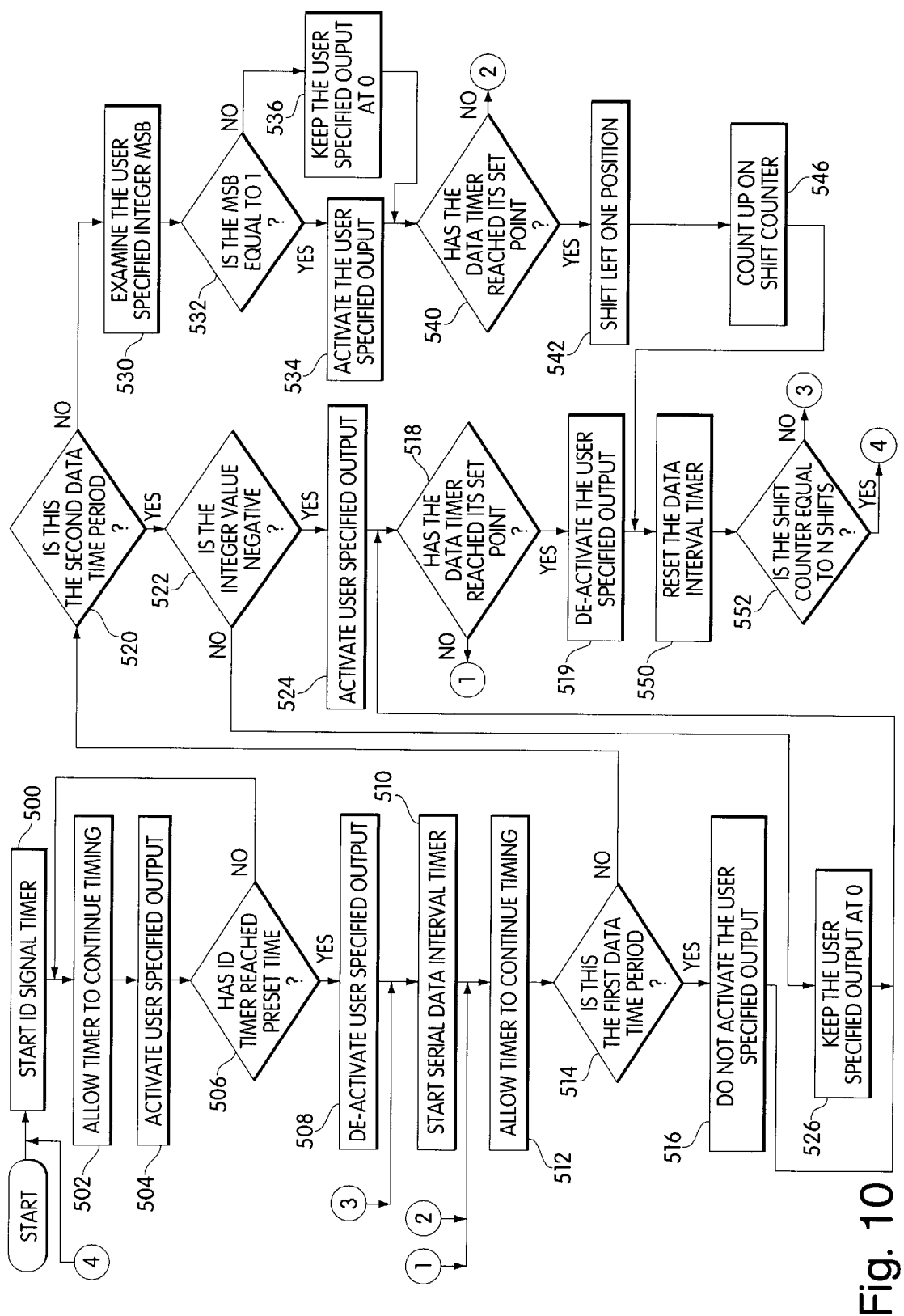
FIG. 10 is a flow diagram that illustrates the routine executed by the microcontroller of FIG. 5 for transmitting serial data to the process controller or executed by the process controller for transmitting serial data to the interface circuit.

A flowchart of the routine executed by the process controller 24 (FIG. 2) for transmitting data words through the binary interface to the interface circuit 54 is shown in FIG. 10. A similar software routine is executed by the interface circuit when it is configured to transmit digital samples to the process controller. An ID pulse timer is started in step 500. The timer continues timing in step 502, and the specified output for transmission of the data word is activated in step 504, until the ID pulse timer has reached a preset time T1, as determined in step 506. After the ID pulse timer has timed out, the specified output is deactivated in step 508, thus terminating the ID pulse. A serial data timer is started in step 510. When the data time period is determined in step 514 to be the first data time period, the specified output is held inactive in step 516 until the data timer has expired, as determined in step 518. This corresponds to the zero 112 shown in FIG. 6. When the data timer has expired, the specified output is deactivated in step 519, the data timer is reset in step 550 and the shift counter is tested in step 552.

During the second data time period as determined in step 520, the sign of the digital sample is determined in step 522. When the sign is negative, the specified output is activated in step 524 until the data timer has expired as determined in step 518. When the sign of the digital sample is positive, the specified output is held at zero in step 526. When the data timer has expired, the specified output is deactivated in step 519, the data timer is reset in step 550 and the shift counter is tested in step 552.

In the third data time period, the most significant bit of the digital sample is examined in step 530. When the most significant bit is equal to one, as determined in step 532, the specified output is activated in step 534. When the most significant bit is a zero, the specified output is held at zero in step 536. When the data timer has expired as determined in step 540, the position in the register holding the digital sample is shifted left one position in step 542. A shift counter is incremented in step 546, and the data timer is reset in step 550. When the shift counter has not reached a value of N, as determined in step 552, the transmission process is repeated for each of the N bits of the digital sample.

When the interface circuit is configured for transmitting two or more analog signals to the process controller or for receiving two or more analog signals from the process controller, the circuit shown in FIG. 5 is modified by adding drivers 100 and 102 for each channel and additional selector switches 82 for setting the parameters for each channel. In addition, the microcontroller 72 provides control signals for selecting the channel being processed. In the input configuration, the analog signal for the selected channel is supplied to the analog-to-digital converter 84. In the output configuration, the output of the digital-to-analog converter 94 is supplied to the selected channel of the signal conditioner, and each channel of the signal conditioner includes a sample-and-hold circuit. Finally, in the output configuration, the digital-to-analog converter 94 is written to as if it was external RAM on the bus 78, rather than connecting the digital-to-analog converter 94 to I/O ports of the microcontroller 72.

Figure 11:
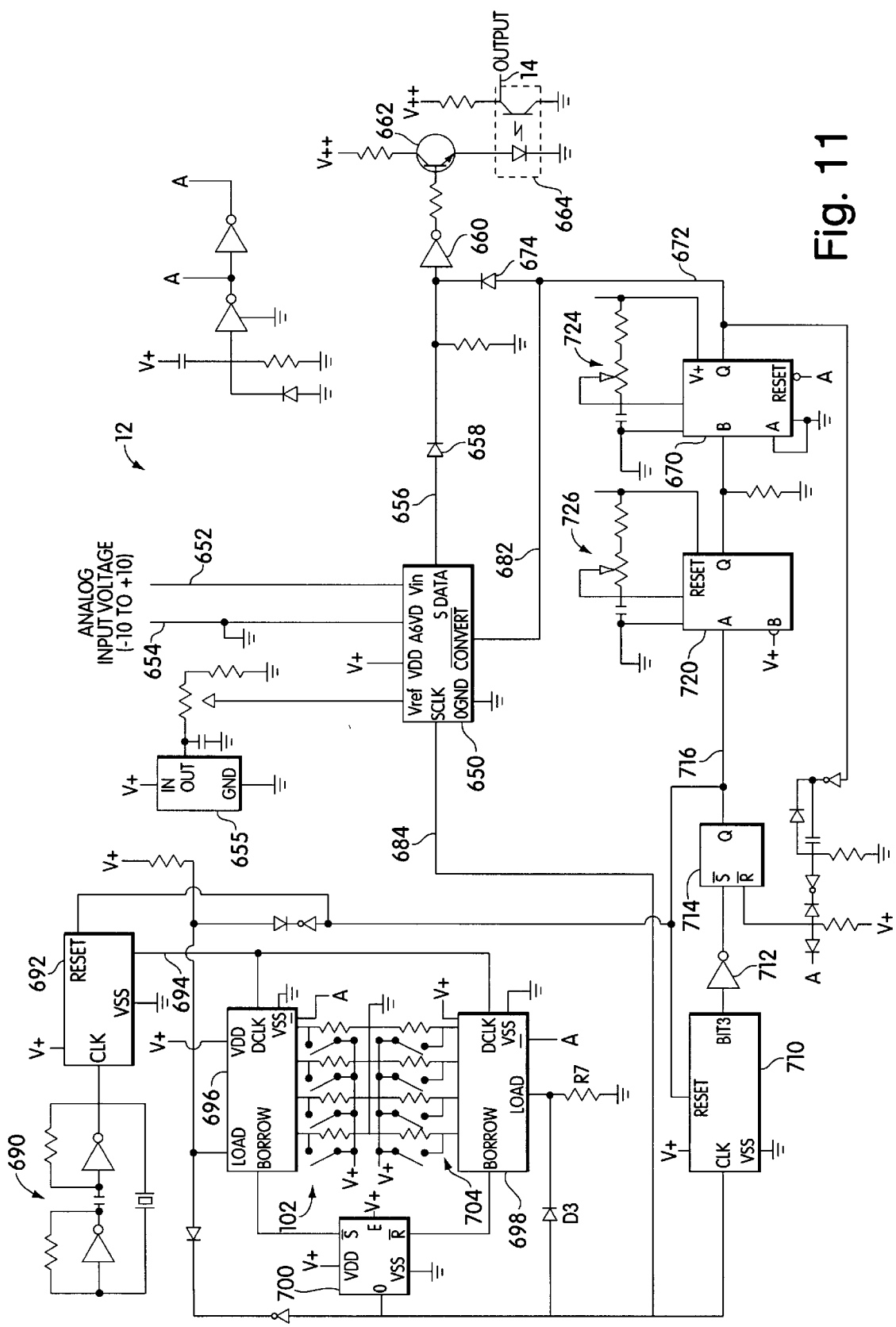
FIG. 11 is a schematic diagram of an alternate embodiment of the single channel interface circuit.

An alternate implementation of the analog-to-digital interface circuit 12 is shown in FIG. 11. A major component of the circuit is an analog-to-digital converter 650 which converts an analog signal applied between an analog input 652 and an analog ground 654 to a digital sample. A reference source 655 generates a reference voltage for the analog-to-digital converter 650. The digital sample is transmitted serially on an output 656. The analog-to-digital converter 650 can, for example, be a 12-bit ADC, type AD7893 manufactured by Analog Devices, Inc. The serial data output from analog-to-digital converter 650 on output 656 is supplied through a diode 658 to an output circuit including an inverter 660, a driver transistor 662 and an optical isolator 664. The output of optical isolator 664 on output line 14 is supplied to digital input card 16 (FIG. 1). In the example given above, the serial data output includes 16bits, with 4 leading zeros followed by 12 bits of conversion data.

The output of the interface circuit 12 also includes an identification pulse. The identification pulse is generated by a one shot pulse generator 670. As shown in FIG. 6, the identification pulse 110 has a period T1. The identification pulse from pulse generator 670 is supplied on a line 672 through a diode 674 to the output interface circuit. The identification pulse is also supplied on a line 682 to the convert input of analog-to-digital converter 650. When the convert input is asserted, the analog-to-digital converter 650 samples the analog input and converts the sampled analog value to a digital sample. The digital sample is clocked out of the analog-to-digital converter 650 by a clock signal on a line 684. Each bit of the serially transmitted digital sample has a period T2, as shown in FIG. 6. In the embodiment of FIG. 11, the data word does not include an overrange bit or a sign bit.

A crystal oscillator 690 generates a clock signal at a frequency of 32 Kilohertz. The output of oscillator 690 is applied to a counter 692. The counter 692 divides the clock output by 32 and supplies a one Kilohertz time base on a line 694 to a timing circuit which includes counters 696 and 698 and a flip-flop 700. Switches 702 and 704 are connected to the preload inputs of counters 696 and 698, respectively. By appropriate selection of the switches 702 and 704, an output clock from flip-flop 700 has a clock period between 1 and 50 milliseconds. The output of flip-flop 700 is supplied on line 684 to the serial clock input of analog-to-digital converter 650 and to the clock input of a counter 710. The counter 710, after 16 input clock pulses, supplies an output through an inverter 712 to set a flip-flop 714. An output of flip-flop 714 on a line 716 resets counters 692 and 710 and triggers a one shot pulse generator 720. The output of flip-flop 714 indicates that 16 clock pulses have been supplied to the analog-to-digital converter 650, thereby insuring that all 12 bits of the digital sample have been transmitted to the digital input card 16.

The pulse generator 720 establishes the timeout period T3 between transmissions of data words. The output of pulse generator 720 is supplied to the input of pulse generator 670. At the end of the timeout period, the pulse generator 670 is triggered to generate another identification pulse, thereby initiating a cycle as described above, including conversion of the analog input to a digital sample and transmission of the identification pulse and the digital sample to the digital input card 16. The cycle includes the identification pulse followed by four leading zeros and 12 bits of data, then followed by the timeout period. The cycle is repeated continuously.

The period T1 of the identification pulse 80 is adjustable in a range of about 1 millisecond to 300 millisecond by adjusting the RC time constant 724 of pulse generator 670. The duration T2 of each bit of the digital sample is adjustable by selection of switches 702 and 704. The duration of the timeout period T3 between conversion cycles is adjustable by varying the RC time constant 726 of pulse generator 720. The timing values T1, T2 and T3 are adjusted for compatibility with the process controller 20 as described above.

Figure 12:
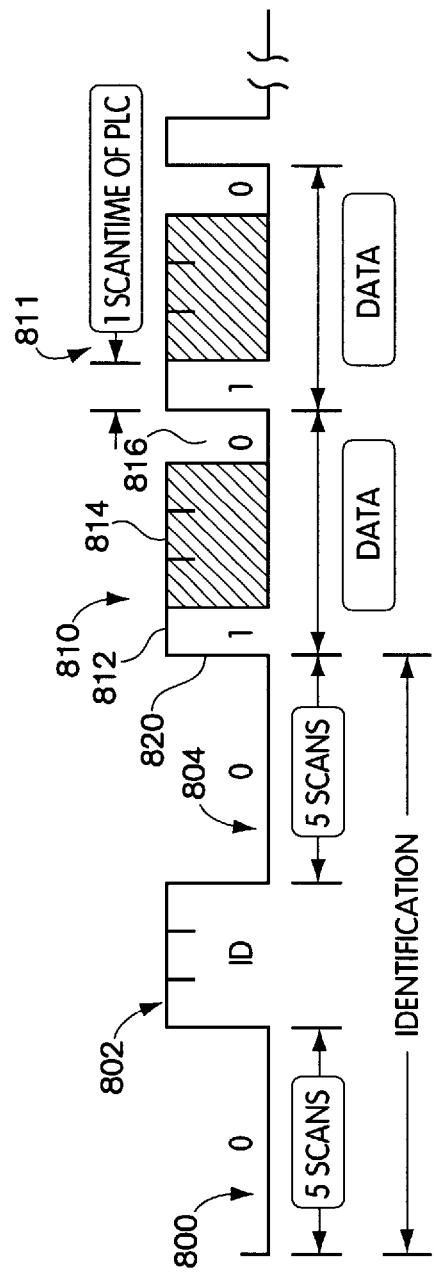
FIG. 12 is a timing diagram showing an alternate format for data transmission from the process controller to the interface circuit.

A timing diagram of an alternate format for transmission of data words from the process controller to the interface circuit is shown in FIG. 12. Each message representative of a single analog value includes an identification followed by a digital word of N data bits 810, 811, etc. The timing is based on the scan time X of the process controller, the interval at which the process controller samples inputs or changes outputs at the binary interface. In the example shown in FIG. 12, the identification includes a first portion 800 comprising an off state having a period of 5 scan times (5X) followed by a second portion 802 comprising an on state having a period of 3 scan times (3X) followed by a third portion 804 comprising the off state having a period of 5X. Each data bit 810, 811, etc. is represented by a sequence comprising a first constant value 812 followed by a binary value 814 of the data bit followed by a second constant value 816. As shown in FIG. 12, the first constant value 812 comprises a pulse, or on state, and the second constant value 816 comprises the off state. The binary value 814 is in the on or off state depending on the binary value of the data bit. The first and second constant values 812 and 816 have periods of at least X, and the data bit 814 has a period of at least 3X. A fixed transition 820 at the beginning of each data bit 810 permits retiming of each data bit received by the interface circuit.

The format for transmission of data words shown in FIG. 12 may be used for transmitting digital words representative of one or more analog signals. When the digital words represent one analog signal, the digital words may be transmitted by the digital output card as shown in FIG. 2. When the digital words represent more than one analog signal, the digital words may be time multiplexed on a single line of the digital output card as shown in FIG. 4A or may be transmitted on separate lines of the digital output card as shown in FIG. 4. When digital words representative of more than one analog signal are time multiplexed on a single line, the data bits for each analog signal are combined into each digital word in a predetermined order. Thus, for example, when digital words representing four analog signals, each represented by samples of N bits, are to be transmitted, each digital word includes 4N bits in a predetermined order.

Figure 13:
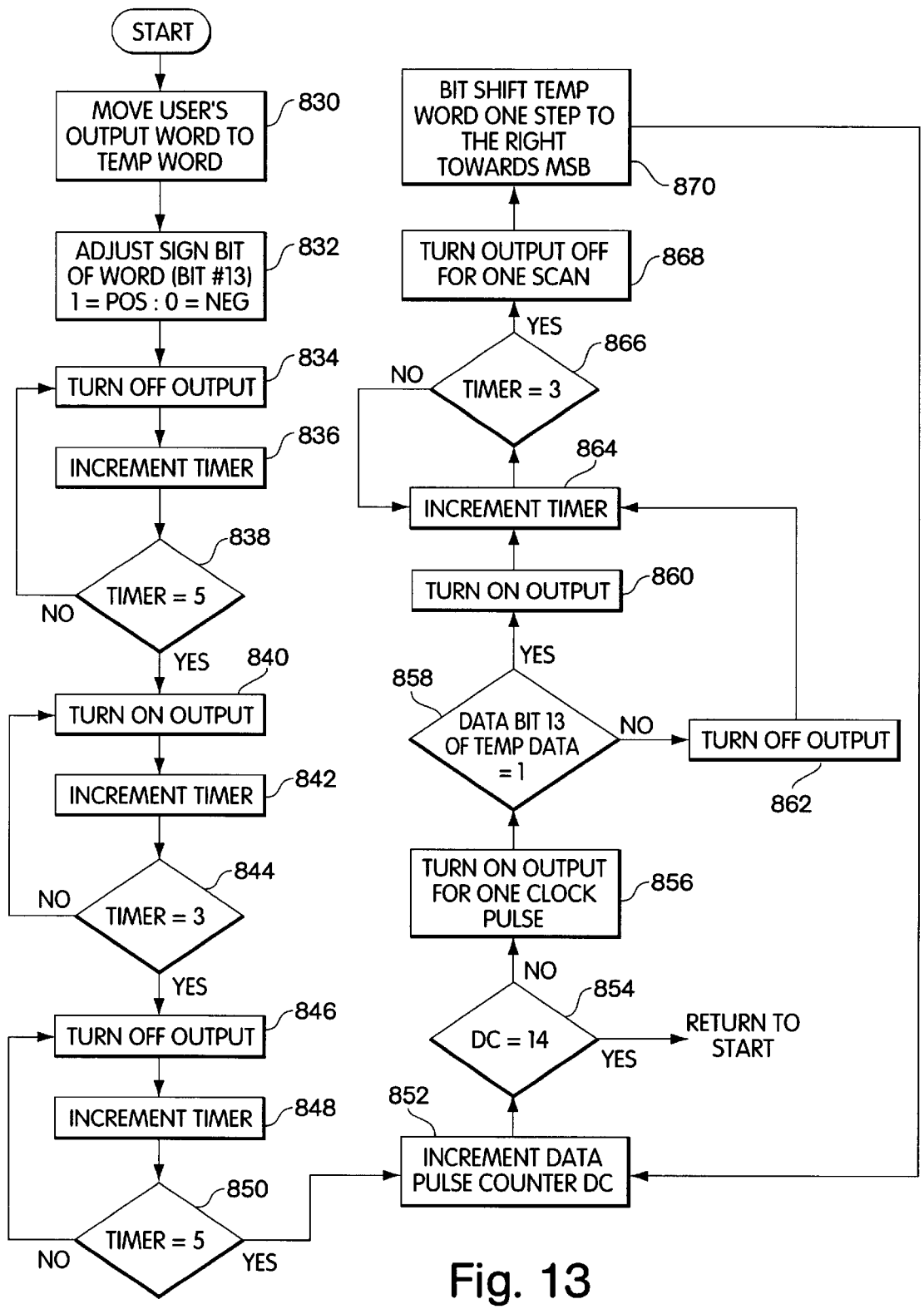
FIG. 13 is a flow diagram that illustrates a routine executed by the process controller for transmitting serial data to the interface circuit in the format shown in FIG. 12.

A flow chart of a routine implemented by the process controller for transmitting data in the format of FIG. 12 is shown in FIG. 13. In step 830, the digital word to be transmitted is moved to a temporary word register. The sign of the digital word is adjusted in step 832. Typically, one of the data bits represents the sign of the digital word. The output is turned off in step 834, and a timer is incremented in step 836. When a time equal to 5 scan times (5X) has elapsed as determined in step 838, the output is turned on in step 840. The timer is incremented in step 842. When the output has been on for 3 scan times (3X) as determined in step 844, the output is turned off in step 846. The timer is incremented in step 848. When the output has been off for 5 scan times (5X) as determined in step 850, the process proceeds to step 852. Steps 834 to 850 implement transmission of the identification shown in FIG. 12.

In step 852, a data pulse counter DC is incremented, and in step 854 the data pulse counter is tested to determine if all the data bits have been transmitted. In the example of FIG. 13, 14 data bits are transmitted. It will be understood that different numbers of data bits may be transmitted in accordance with the invention. In step 856, the output is tuned on for one scan time so as to transmit constant value 812 (FIG. 12). When the data bit is determined in step 858 to have a binary value of "1", the output is turned on in step 860. When the data bit is determined in step 858 to have a binary value of "0", the output is turned off in step 862. Following step 860 or 862, the timer is incremented in step 864. When the timer reaches a value of 3 scan times (3X) as determined in step 866, the output is turned off for one scan time in step 868. This represents the second constant value 816 as shown in FIG. 12. Then the data word in the temporary register is shifted one bit position to the right toward the MSB in step 870, and the process returns to step 852 for transmission of the next data bit. The process is repeated until all data bits have been transmitted.

Figure 14:
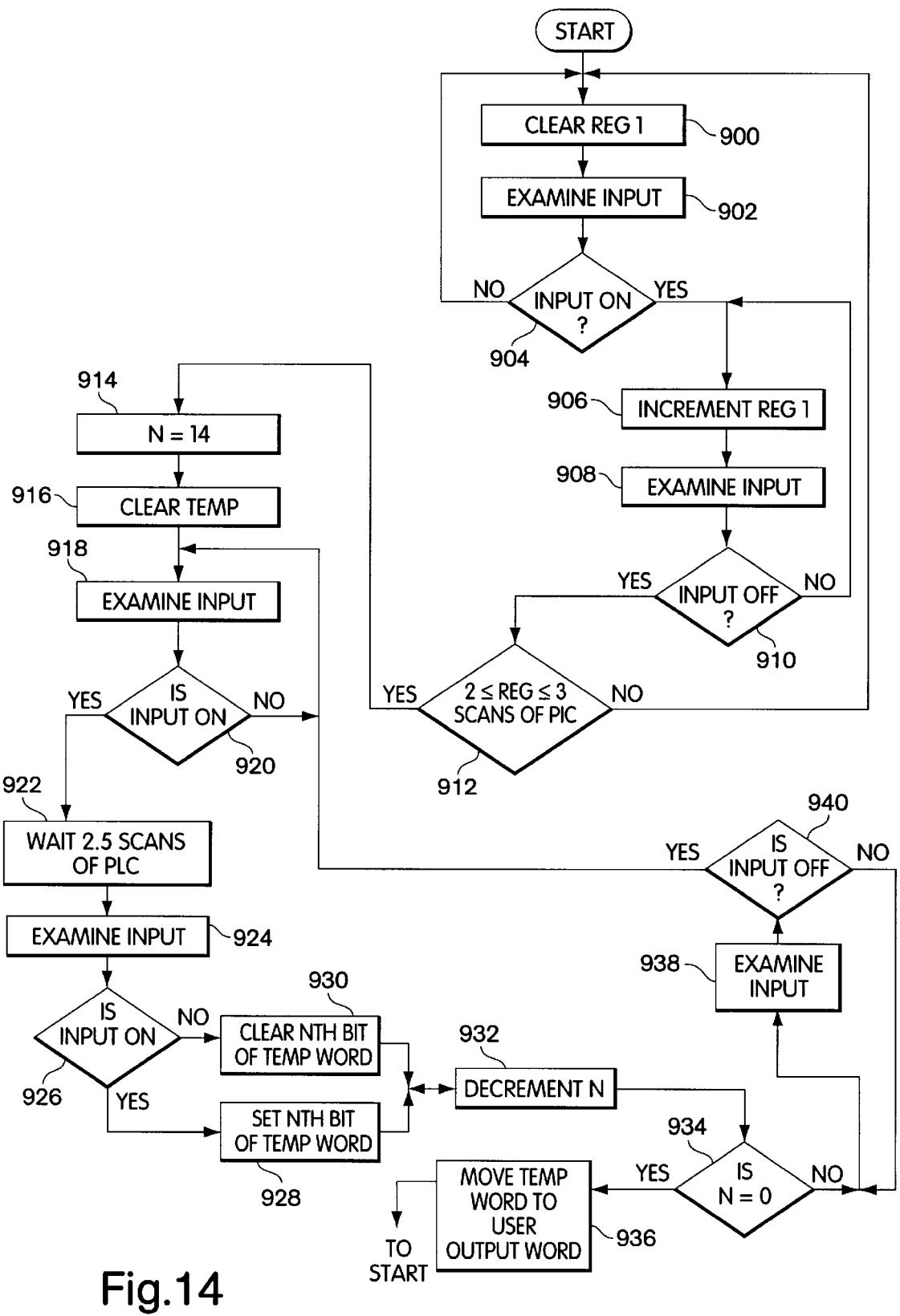
FIG. 14 is a flow diagram that illustrates a routine executed by the interface circuit for receiving serial data from the process controller in the format shown in FIG. 12.

A flow chart of a routine implemented by the interface circuit for receiving data words in the format of FIG. 12 is shown in FIG. 14. In step 900, a register designated as register 1 is cleared, and the input from the process controller is examined in step 902. If the input is determined to be on in step 904, register 1 is incremented in step 906. The input is examined in step 908. If the input remains on as determined in step 910, register 1 is incremented for each scan time of the process controller. When the input goes to an off state as determined in step 910, the value in register 1 is tested in step 912. When the value in register 1 is between 2 and 3, indicating receipt of identification pulse 802, the process proceeds to step 914 for receipt of the data bits.

In step 914, a value n in a register is set to 14, representative of the number of bits in the digital word, and a temporary register is cleared in step 916. The input is examined in step 918. When the input is determined to be on in step 920, the process waits 2.5 scan times (2.5X) of the process controller in step 922 and then examines the input in step 924. By waiting 2.5 X following the receipt of first constant value 812, the input is examined in step 924 approximately in the middle of the binary value 814. When the input is determined to be on in step 926, the nth bit of the temporary register is set in step 928. When the input is determined to be off in step 926 the nth bit of the temporary register is cleared in step 930. The value n is decremented in step 932. When n is determined to be 0 in step 934, receipt of the digital word is complete, and the value in the temporary register is moved to the user output word in step 936. When n is determined not to be 0 in step 934, the input is examined in step 938 to test for the second constant value 816. When the input is determined to be off in step 940, the process returns to step 918. A subroutine for receiving data bits including steps 918–940 is repeated for each data bit.

Figure 15:
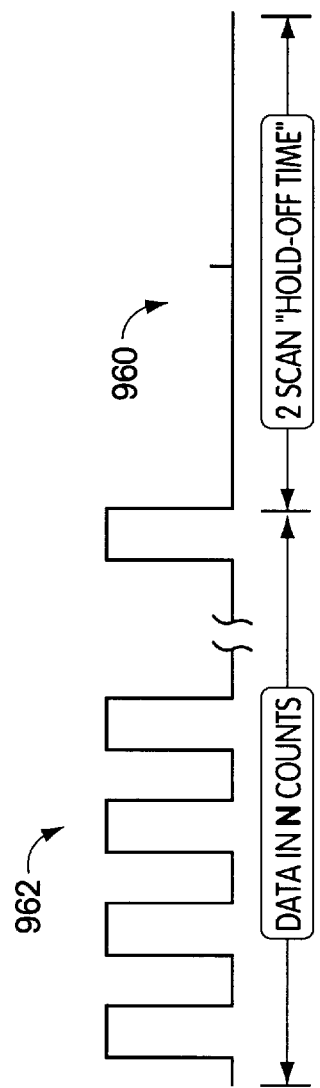
FIG. 15 is a timing diagram showing a format for data transmission in a high speed counter mode.

A timing diagram of a data format utilized in a high speed counter mode is shown in FIG. 15. In the high speed counter mode, each message representative of a single analog value includes a data word 962 comprising a series of pulses which represent an analog value. The number of pulses transmitted is representative of the analog value to be transmitted. Preferably, a number P of pulses transmitted includes a constant number of pulses and a variable number of pulses. The variable number of pulses represents the analog value. The constant number of pulses insures that one or more pulses are transmitted even when the analog value is zero. In a preferred embodiment, a single constant pulse may be transmitted to minimize transmission time. The P pulses preferably have a uniform pulse width and pulse rate, with the number of pulses representing the analog value. The data word 962 is followed by an end identification 960. The end identification 960 may, for example, include holding the output in the off state for a period of two scan times (2X) of the process controller. This insures a clear delineation between data words.

The high speed counter mode takes advantage of a counter which may be available in some process controllers. In particular a counter in the process controller is connected to the data lines of the binary interface and accumulates a count of pulses received on the data line, independent of scanning by the process controller. The process controller may be programmed to examine the value in the counter at intervals of one scan time. The counter in the process controller may typically be capable of receiving a series of pulses at rates up to about 10 kHz. Although the high speed counter mode takes advantage of a counter which may be present in the process controller, the data format shown in FIG. 15 may be used for transmission of data from the process controller to the interface circuit as well as for transmission of data from the interface circuit to the process controller.

Figure 16:
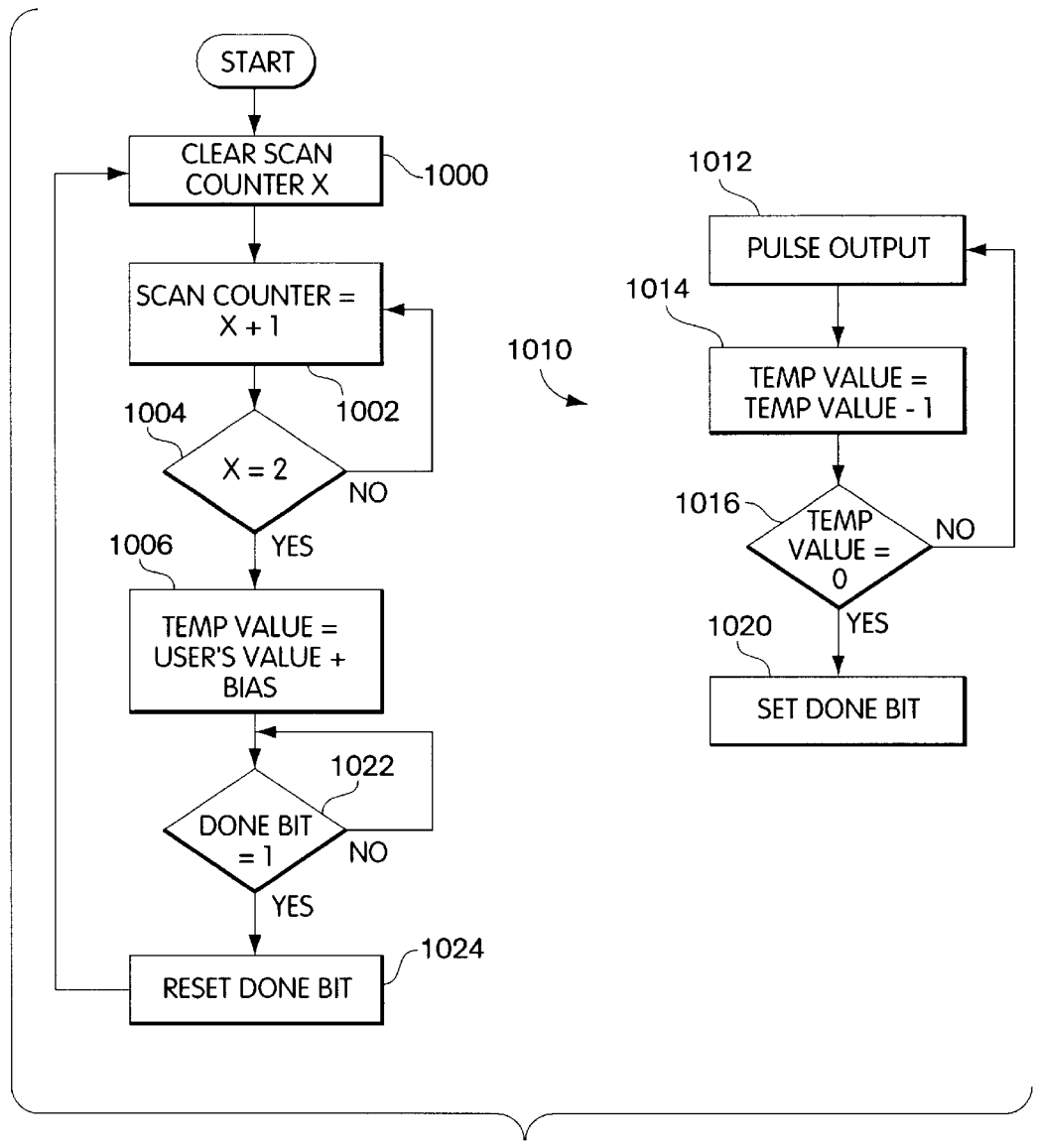
FIG. 16 is a flow diagram that illustrates a routine executed by the interface circuit or the process controller for transmitting serial data in the format shown in FIG. 15.

A flow chart of a routine for transmitting data in the high speed counter mode of FIG. 15 is shown in FIG. 16. A scan counter x is cleared in step 1000. The scan counter x is incremented in step 1002 each time a period equal to the scan time X of the process controller expires. When the value in the scan counter is equal to 2 as determined in step 1004, corresponding to transmission of the end identification 960 shown in FIG. 15, a temporary value is set in step 1006 to the analog value to be transmitted plus a constant value. A pulse output routine 1010 operates in parallel with the main routine shown in FIG. 16. A pulse is output in step 1012, and the temporary value is decremented in step 1014. As indicated above, the temporary value represents the value to be transmitted plus a constant. The new temporary value is tested in step 1016. As long as the temporary value is not equal to 0, additional pulses are transmitted in step 1012. When the temporary value reaches 0, indicating that the desired number of pulses has been transmitted, a done bit is set in step 1020. Referring again to the main routine, the done bit is tested in step 1022. The done bit is set by the pulse output routine 1010 to indicate that the data word has been transmitted. The done bit is then reset in step 1024. The process returns to step 1000 for transmission of the next data word.

Figure 17:
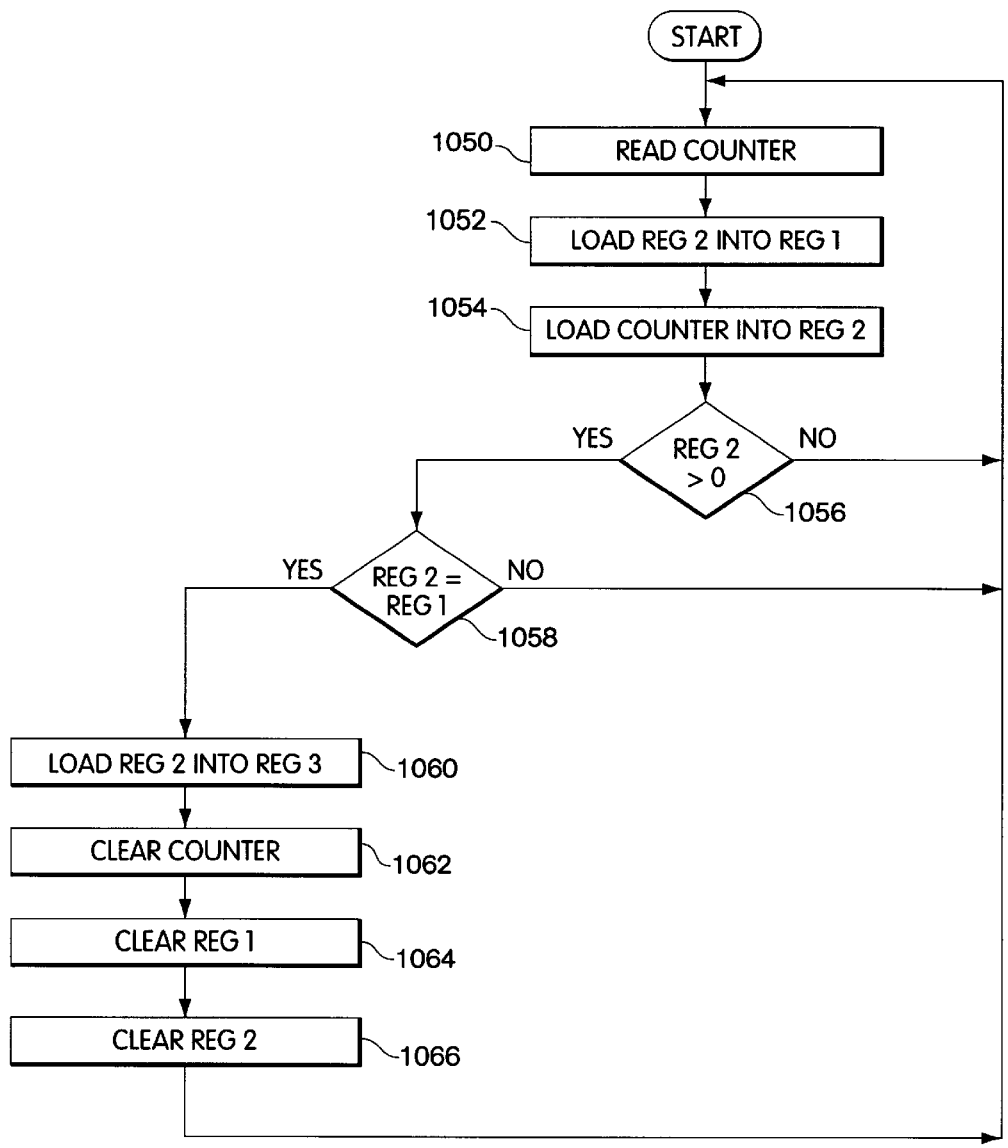
FIG. 17 is a flow diagram that illustrates a routine executed by the interface circuit or the process controller for receiving serial data in the format shown in FIG. 15.

A flow chart of a routine for receiving data in the high speed counter mode of FIG. 15 is shown in FIG. 17. The counter in the process controller is read in step 1050. As indicated above, the counter is connected to the data line of the binary interface and accumulates a count of pulses received on the data line. The routine of FIG. 17 uses registers in the process controller designated as register 1, register 2, and register 3. In step 1052, the value in register 2 is loaded into register 1, and in step 1054 the value read from the counter is loaded into register 2. In step 1056 the value in register 2 is tested. When the value in register 2 is greater than 0, indicating that pulses were received by the counter, register 2 is compared with register 1 in step 1058. The value in register 1 represents the value in the counter from the previous scan. When the count remains the same for two scans, as indicated by the values in registers 1 and 2 being equal, a complete data word has been received by the counter. Conversely, a data word may be received during two scan times of the process controller. In this case, the values in registers 1 and 2 will not be equal, and the process returns to step 1050 to obtain a later reading of the counter. When the values in registers 1 and 2 are determined to be equal in step 1058, indicating that transmission of the data word was complete, the value in register 2 is loaded into register 3 in step 1060. Register 3 then contains the transmitted value. The counter is cleared in step 1062, and registers 1 and 2 are cleared in steps 1064 and 1066, respectively. The process controller is then ready for receiving a new data word.

The high speed counter mode may be used for transmitting data from the interface circuit to the process controller or may be used for transmitting data from the process controller to the interface circuit. Thus, the routine of FIG. 16 may be implemented by either the interface circuit or the process controller for transmitting data in the high speed counter mode. Similarly, the routine of FIG. 17 may be implemented by the interface circuit or the process controller for receiving data in the high speed counter mode. When the interface circuit receives data from the process controller in the high speed counter mode, the microcontroller is programmed to count pulses received from the process controller, thereby implementing the function of a counter.

Figure 18:
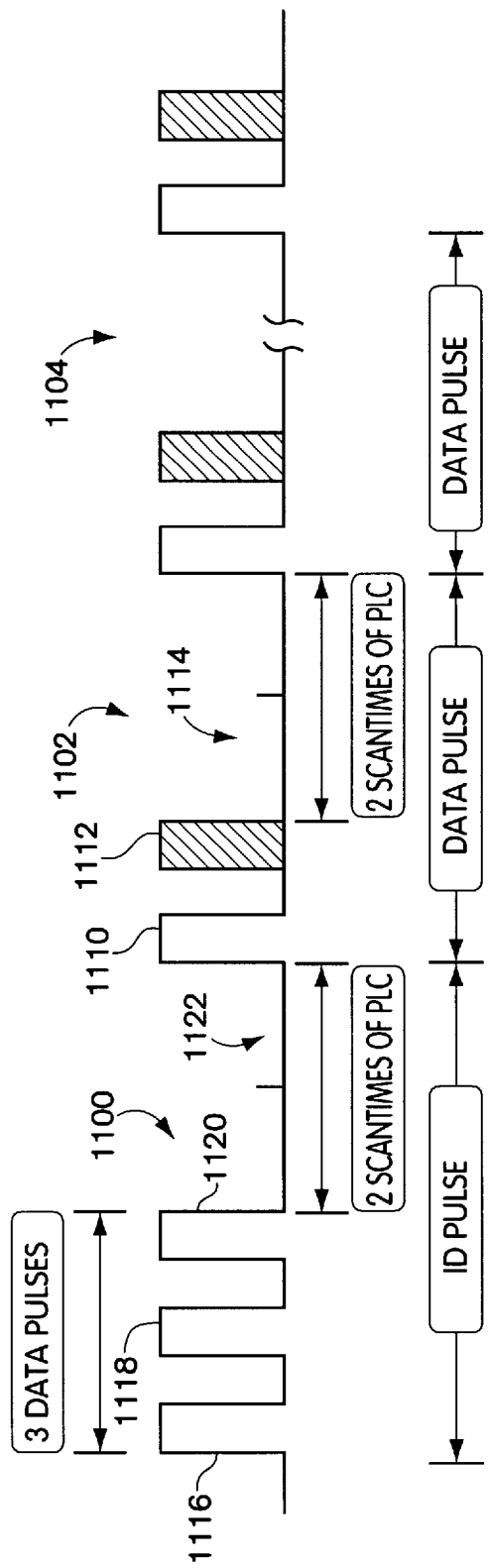
FIG. 18 is a timing diagram showing a format for data transmission in a binary weighted high speed counter mode.

A timing diagram of a data format utilized in a binary weighted counter mode is shown in FIG. 18. A message representative of a single analog value includes an identification 1100 and a digital word of N data bits 1102, 1104, etc. The binary weighted counter mode shown in FIG. 18 utilizes the counter hardware in the process controller as described above in connection with the high speed counter mode. However, in contrast to the high speed counter mode, wherein the number of pulses transmitted represents an analog value, the analog value is represented by a binary code in the binary weighted counter mode. In particular, the analog value is represented by the digital word of N bits 1102, 1104, etc., each of which is transmitted separately. As shown in FIG. 18, each data bit is represented by a first number of pulses when the data bit has a first binary value and is represented by a second number of pulses when the data bit has a second binary value. In a preferred embodiment, a single pulse 1110 represents a binary value of "0" and two pulses 1110 and 1112 represent a binary value of "1." An off state 1114 having a period of at least 2 scan times (2X) follows the pulses of the data bit. The sequence of data bit 1102 is repeated for each data bit in the data word. The identification 1100 preferably includes a series of 3 pulses, 1116, 1118, 1120 followed by an off state 1122 having a period of at least 2 scan times (2X). In the format of FIG. 18 the pulses 1110, 1112, 1116, 1118 and 1120 may be transmitted up to the maximum rate of the counter in the process controller, typically 10 kHz.

The binary weighted counter mode may be used for transmitting digital words representative of analog signals from the interface circuit to the process controller or may be used for transmitting digital words representative of analog signals from the process controller to the interface circuit. In addition, the binary weighted counter mode may be used for transmitting digital words representative of one or more analog signals. When the digital words represent one analog signal, the digital words may be transmitted as shown in FIGS. 1 and 2. When the digital words represent more than one analog signal, the digital words may be time multiplexed on a single line of the digital input or output card, as shown in FIGS. 3A and 4A, or may be transmitted on separate lines of the digital input or output card, as shown in FIGS. 3 and 4. When digital words representative of more than one analog signal are time multiplexed on a single line, the data bits for each analog signal are combined into each digital word in a predetermined order. Thus, for example, when digital words representing four analog signals, each represented by samples of N bits, are to be transmitted, each digital word includes 4N bits in a predetermined order.

Figure 19:
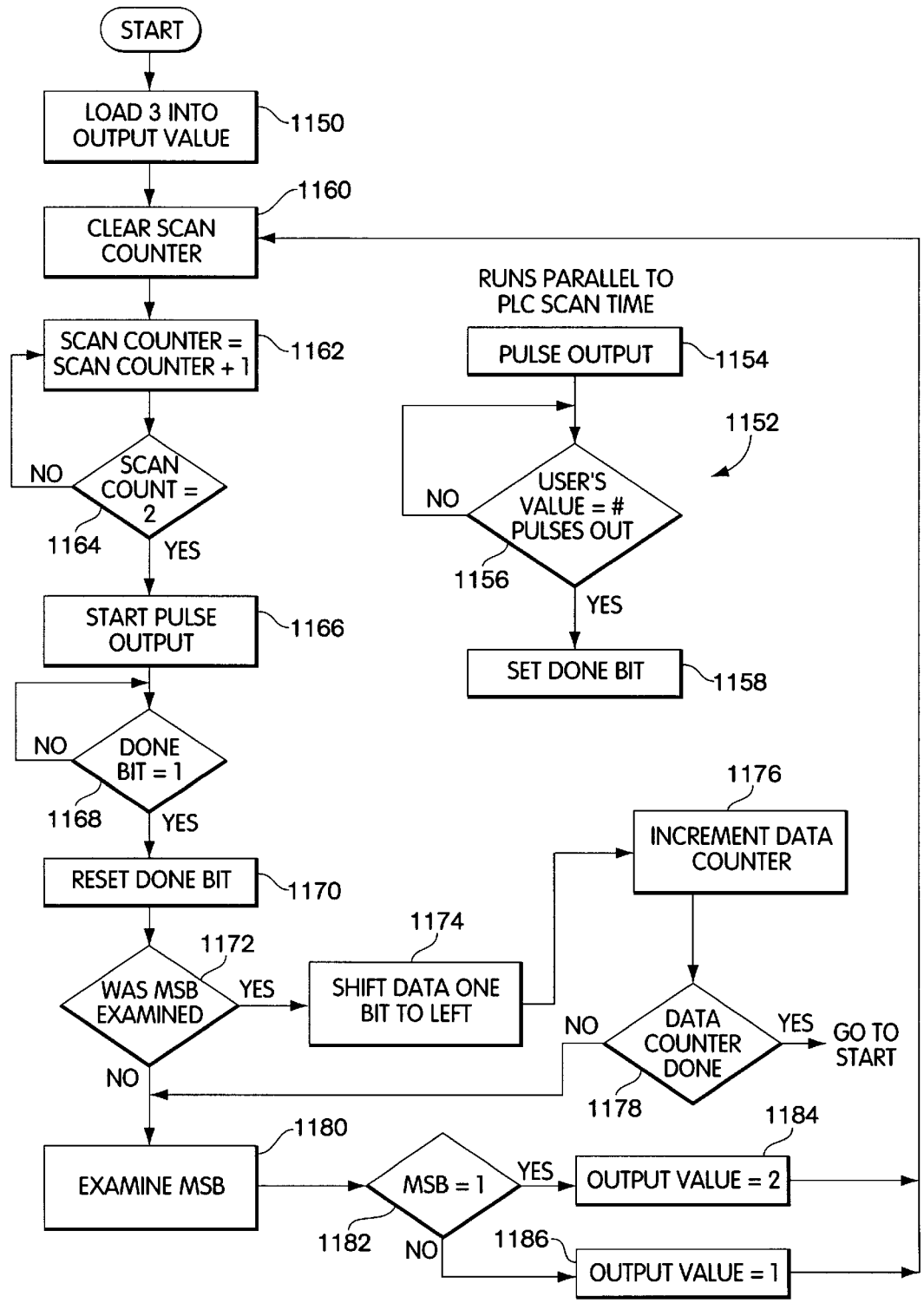
FIG. 19 is a flow diagram that illustrates a routine executed by the interface circuit or the process controller for transmitting serial data in the format shown in FIG. 18.

A flow chart of a routine for transmitting data using the binary weighted counter format of FIG. 18 is shown in FIG. 19. In step 1150, the value 3 is loaded into an output value register. A scan counter is cleared in step 1160. The scan counter is incremented in step 1162, and, when the scan count reaches a value of 2 as determined in step 1164, a pulse output routine 1152 is started in step 1166. The pulse output routine 1152 runs in parallel with the main routine of FIG. 19 for transmission of pulses. In pulse output routine 1152, a pulse is transmitted in step 1154, and the number of pulses is checked against the output value register in step 1156. After the specified number of pulses is transmitted, a done bit is set in step 1158. The done bit is tested in step 1168 of the main routine. The done bit is reset in step 1170, and it is determined in step 1172 if the MSB of the data word has been examined. When the MSB has been examined, the data is shifted one bit to the left in step 1174, and a data counter is incremented in step 1176. The data counter is compared with the number of data bits to be transmitted in step 1178. When the data counter indicates that all data has not been transmitted, the MSB of the data word is examined in step 1180. Alternatively, if it is determined in step 1172 that the MSB has not been examined, the process proceeds directly to step 1180. When it is determined in step 1182 that the MSB has a binary value of "1," the output value is set to 2 in step 1184. When the MSB is determined in step 1182 to have a binary value of "0," the output value is set to 1 in step 1186. The value of 2 in step 1184 indicates that pulses 1110 and 1112 will be transmitted. The value of 1 in step 1186 indicates that only pulse 1110 will be transmitted. The process then returns to step 1160 so as to generate the off state 1114 for 2 scan times (2X) of the process controller. Each data bit of one pulse or two pulses is transmitted by the pulse output routine 1152. The process is repeated until all data bits have been transmitted.

Figure 20:
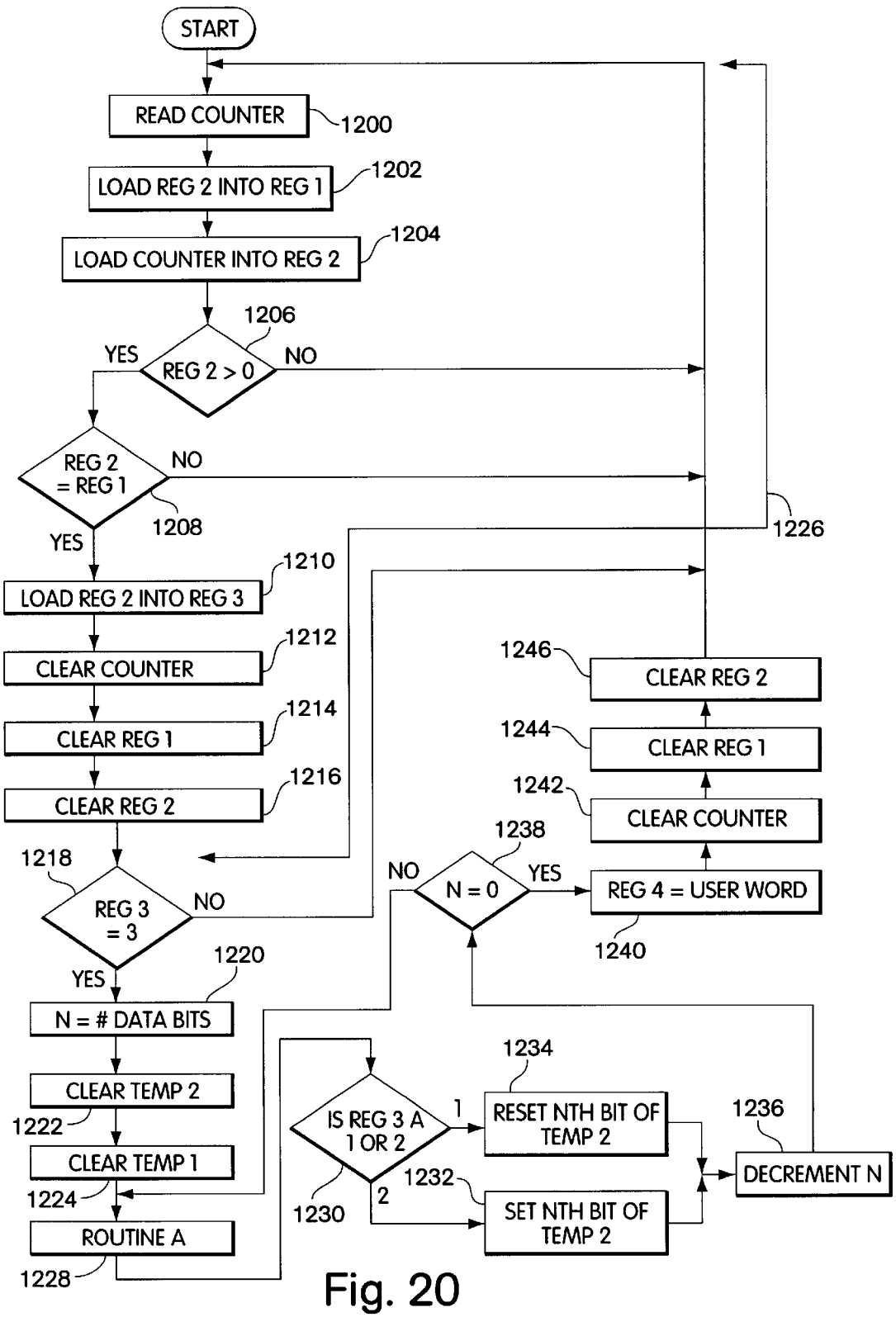
FIG. 20 is a flow diagram that illustrates a routine executed by the interface circuit or the process controller for receiving serial data in the format shown in FIG. 18.

A routine for receiving data words in the binary weighted counter mode of FIG. 18 is shown in FIG. 20. Registers 1, 2, 3 and 4 are utilized in the routine of FIG. 20. The counter which receives the pulses from the interface circuit is read in step 1200. The contents of register 2 are loaded into register 1 in step 1202, and the contents of the counter are loaded into register 2 in step 1204. Register 2 is tested in step 1206. If register 2 contains a value greater than 0, the contents of register 2 are compared with the contents of register 1 in step 1208. When the contents of registers 1 and 2 are equal, indicating that transmission of an identification or of a data bit is complete, the contents of register 2 are loaded into register 3 in step 1210. The counter is cleared in step 1212, and registers 1 and 2 are cleared in steps 1214 and 1216, respectively. The value in register 3 is tested in step 1218. When the value in register 3 equals 3, indicating that an identification was received, the value of a variable n is set to the number of data bits to be received in step 1220. The routine also utilizes temporary registers 1 and 2. Temporary registers 1 and 2 are cleared in steps 1222 and 1224, respectively. A routine 1226 including steps 1200–1216 is executed in step 1228. The value in register 3 is tested in step 1230. When register 3 contains a value of 2, indicating that the data bit contained two pulses, the nth bit of temporary register 2 is set in step 1232. When register 3 contains a value of 1, indicating that the data bit contained one pulse, the nth bit of temporary register 2 is reset in step 1234. The value of n is decremented in step 1236, and the value of n is tested in step 1238. When the value of n is not equal to zero, the process proceeds to step 1228 for processing the next data bit. When the value of n is equal to zero, the data bits are loaded into register 4 as the received data word in step 1240. The counter and registers 1 and 2 are cleared in steps 1242, 1244 and 1246, respectively. The process then proceeds to step 1200 for reception of another data word.

As indicated above, the binary weighted counter mode may be used for transmitting data from the interface circuit to the process controller or may be used for transmitting data from the process controller to the interface circuit. Thus, the routine of FIG. 19 may be implemented by the interface circuit or by the process controller for transmitting data in the binary weighted counter mode. Similarly, the routine of FIG. 20 may be implemented by the interface circuit or by the process controller for receiving data in the binary weighted counter mode.

A delta mode can be utilized to reduce the quantity of data transmitted in either direction between the interface circuit and the process controller and to thereby reduce transmission time. The delta mode is based on the fact that analog values being transmitted to or from a process controller are typically slowly varying as a function of time. Thus the change, or delta, between successive values is typically a small value. A small value can be represented by fewer binary bits or pulses and can thereby be transmitted in a shorter time. For example, transmission of a full analog value may require 12 or 14 bits, whereas transmission of a change from a previous value may require only 3 or 4 bits. The delta mode may be utilized with any of the data formats which include an identification to synchronize transmission, including the data formats of FIGS. 6, 12 and 18. These data formats are utilized simply by reducing the number of bits transmitted to correspond to the delta from the previous analog value. One of the bits transmitted indicates whether the data word is a delta data word representative of a delta value or a full data word representative of a full analog value.

The delta mode may be utilized for transmitting digital words representative of analog signals from the interface circuit to the process controller or for transmitting digital words representative of analog signals from the process controller to the interface circuit. In addition, the delta mode may be used for transmitting digital words representative of one or more analog signals. When the digital words represent one analog signal, the digital words may be transmitted as shown in FIGS. 1 and 2. When the digital words represent more than one analog signal, the digital words may be time multiplexed on a single line of the digital input or output card, as shown in FIGS. 3A and 4A, or may be transmitted on separate lines of the digital input or output card, as shown in FIGS. 3 and 4. When digital words representative of more than one analog signal are time multiplexed on a single line, the data bits for each analog signal are combined into each digital word in a predetermined order. Thus, for example, when digital words representing four analog signals, each represented by samples of N bits, are to be transmitted, each digital word includes 4 N bits in a predetermined order.

Figure 21:
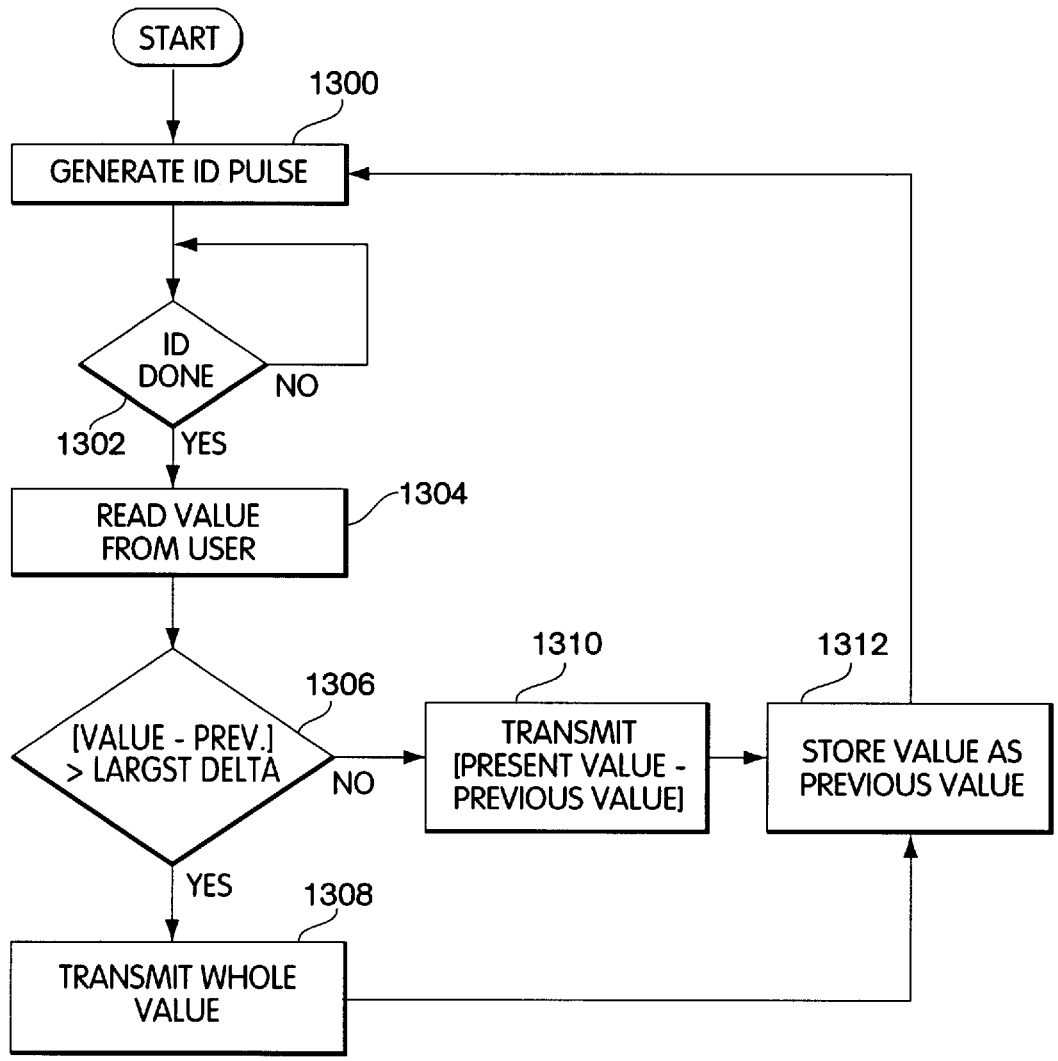
FIG. 21 is a flow diagram that illustrates a routine executed by the interface circuit or the process controller for transmitting serial data in a delta mode.

A routine for transmitting data the delta mode is illustrated in FIG. 21. An identification is generated in step 1300. The identification may have any of the formats described above. When the identification is complete as determined in step 1302, the analog value is read in step 1304. In step 1306, the absolute value of the difference between the current analog value and the previous analog value is compared with a maximum delta value, which may be arbitrarily established. When the difference between the current value and the previous value exceeds the maximum delta, a full data word representing the full analog value is transmitted in step 1308. When the difference between the current value and the previous value does not exceed the maximum delta, the difference, or delta, is transmitted in step 1310. Then, the current value is stored as the previous value in step 1312. The process then returns to step 1300 for transmission of the next data word.

Figure 22:
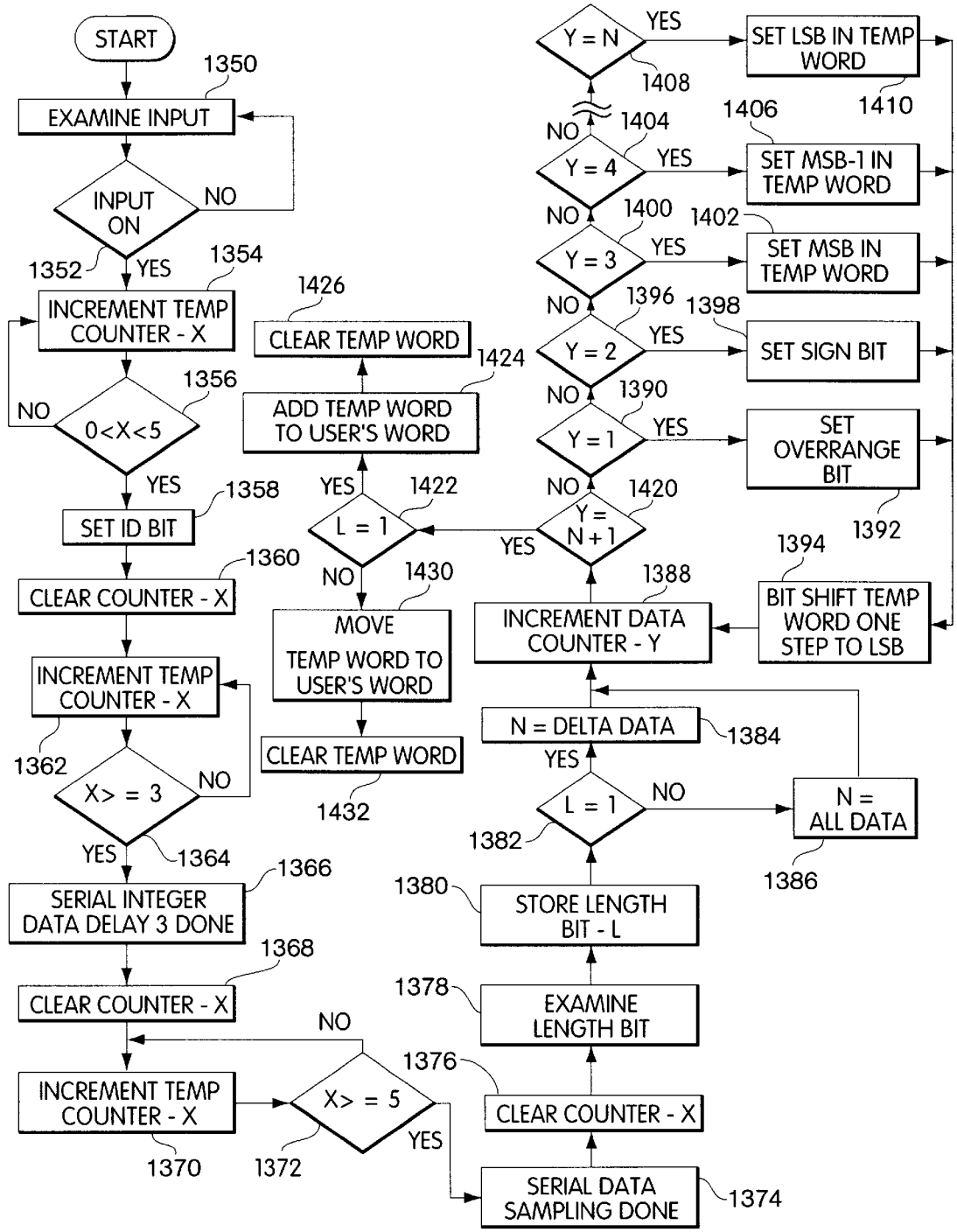
FIG. 22 is a flow diagram that illustrates a routine executed by the interface circuit or the process controller for receiving serial data in the delta mode.

A flow diagram of a routine for receiving data words in the delta format is shown in FIG. 22. The input is examined in step 1350. When the input is determined to be on in step 1352, a temporary counter x is incremented in step 1354. When the value in counter x is determined to be in a range between 0 and 5 in step 1356, the ID bit is set in step 1358, and counter x is cleared in step 1360. Then counter x is incremented in step 1362. When the counter x is determined in step 1364 to contain a value equal to or greater than 3, a serial integer delay of three is done in step 1366, and the counter x is cleared in step 1368. The counter x is then incremented in step 1370. When the value in counter x is determined in step 1372 to be equal to or greater than 5, serial data sampling is done in step 1374, and counter x is cleared in step 1376. A length bit L is examined in step 1378, and the length bit L is stored in step 1380. When the length bit L is determined in step 1382 to be equal to "1," the number N of bits to be transmitted is set in step 1384 to the value corresponding to delta data. When the bit length L is not equal to "1" as determined in step 1382, the value of N is set to the number of bits for transmitting a full data word in step 1386. A data counter y is incremented in step 1388. When the value of y is determined in step 1390 to be equal to 1, the overrange bit is set in step 1392, and the value to be transmitted is shifted one bit toward the LSB in step 1394. The process then proceeds to step 1388 where the data counter y is incremented. When the value of y is determined in step 1396 to be equal to 2, the sign bit is set in step 1398. The process then proceeds to step 1394. When the value of y is equal to 3 as determined in step 1400, the MSB is set in the temporary word in step 1402. The process then proceeds to step 1394. When the value of y is equal to 4 as determined in step 1404, bit MSB -1 is set in temporary word in step 1406. The process then proceeds to step 1394.

When the value of y is equal to N as determined in step 1408, the LSB is set in the temporary word in step 1410. The process then proceeds to step 1394. When the value of y is equal to N+1 as determined in step 1420, the value of length bit L is tested in step 1422. When the length bit L is equal to 1, the temporary word is added to the user's word in step 1424, and the temporary word is cleared in step 1426. When the length bit L is not equal to 1 as determined in step 1422, the temporary word is moved to the user's word in step 1430, and the temporary word is cleared in step 1432.

Figure 23:
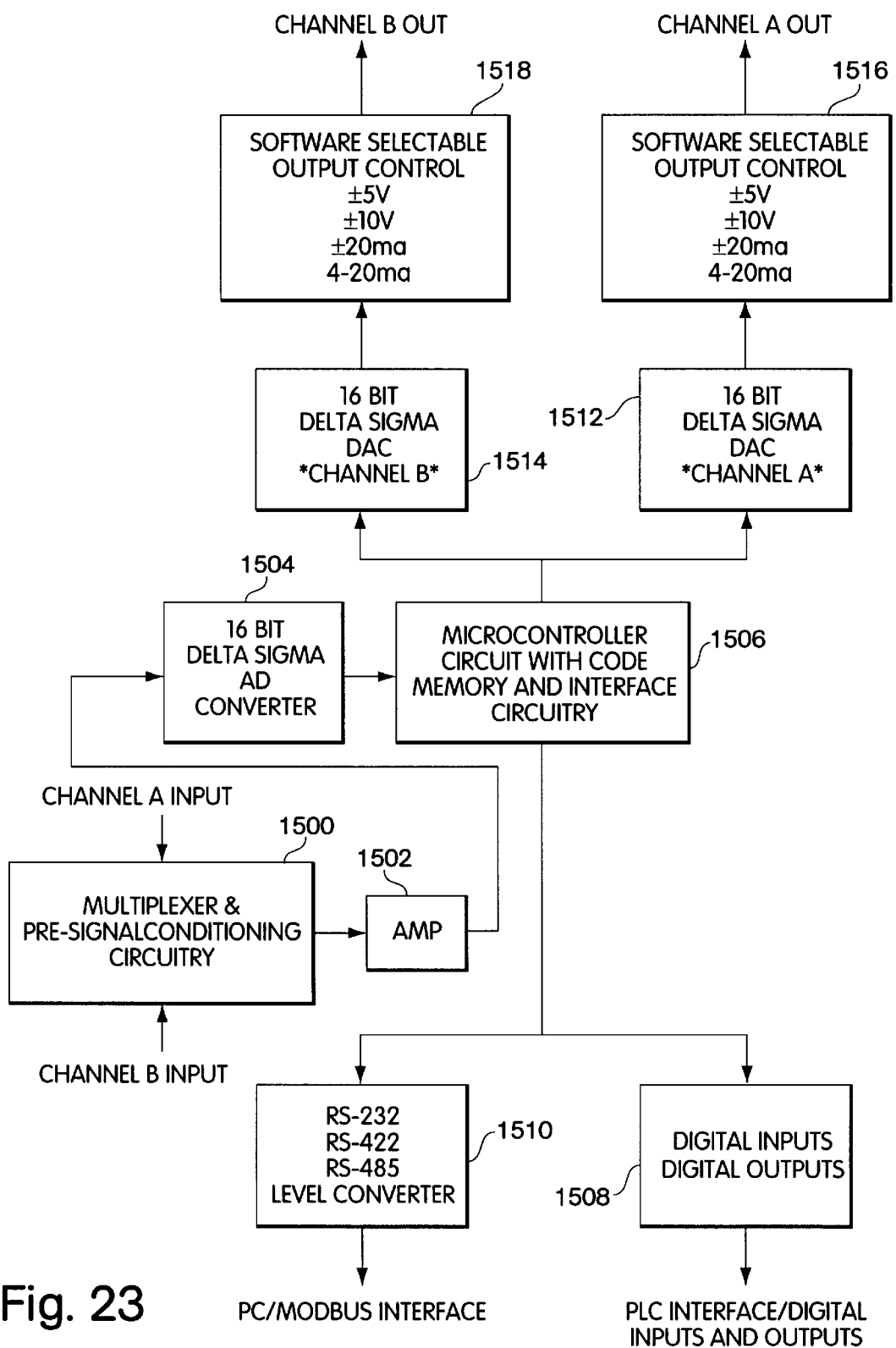
FIG. 23 is a block diagram of a quad channel interface circuit.

A block diagram of a quad channel interface circuit is shown in FIG. 23. A multiplexer and signal conditioning circuitry 1500 receives a channel A input and a channel B input. A and B signals are supplied through an instrumentation amplifier 1502 to an analog-to-digital converter (ADC) 1504. The output of ADC 1504 is supplied to a microcontroller 1506. Microcontroller 1506 provides digital inputs and outputs to the process controller or process monitor through an interface circuit 1508. The microcontroller 1506 may provide digital inputs and outputs to a personal computer through an interface circuit 1510. Outputs of the interface circuit are provided by the microcontroller 1506 through a channel A digital-to-analog converter (DAC) 1512 and a channel B DAC 1514. The outputs of the DAC's 1512 and 1514 are supplied through output conditioning circuits 1516 and 1518, respectively. The circuits 1516 and 1518 are software controllable as to voltage and current ranges. In a preferred embodiment, the microcontroller 1506 is a Siemens SABC501, the ADC 1504 is a 16 bit delta sigma ADC, such as a type AD7712, and the DAC's 1512 and 1514 are 16 bit delta sigma DAC's such as type AD420AR-32.

The transmission of data from the interface circuit to the process controller, or from the process controller to the interface circuit, uses no handshaking or error correction techniques to transmit and receive data. The interface circuit and the process controller run completely asynchronously, with no feedback of any kind transmitted from the process controller to the interface circuit to confirm reception of data. The identification pulse is recognized by the process controller because its pulse duration is different from the duration of each of the data bits in the serially transmitted digital sample. As a result, an analog signal can be transmitted to the process controller through a digital input card or other digital interface that is not designed for handling analog signals and is not designed for handling serial data. Similarly, an analog signal can be transmitted from the process controller through a digital output card or other digital interface that is not designed for handling analog signals and is not designed for handling serial data. Thus, the present invention provides a low cost approach to inputting of analog signals to process apparatus and outputting analog signals from process apparatus.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An interface circuit for conversion of a signal transmitted serially by process apparatus having a binary interface, said signal including an identification followed by a digital word of N bits representative of an analog value, said process apparatus having a scan time X for changing output values at said binary interface, said interface circuit comprising:

means for receiving said identification followed by said digital word of N bits, said means for receiving including means for recognizing each of the N bits of said digital word as a sequence comprising a first constant value having a period of at least X followed by a data bit having a period of at least 3X followed by a second constant value having a period of at least X; and means for converting the N bits of said digital word to said analog value.

2. An interface circuit as defined in claim 1 wherein said first constant value comprises an on state and wherein said second constant value comprises an off state.

3. An interface circuit as defined in claim 1 wherein said identification comprises an off state having a period of at least 5X followed by an on state having a period of at least 3X followed by the off state having a period of at least 5X.

4. An interface circuit as defined in claim 1 wherein said digital word represents two or more analog signals and wherein said means for converting comprises means for converting the N bits of said digital word into said two or more analog signals.

5. A system comprising:

process apparatus including a binary interface and means for outputting binary values at said binary interface with a scan time X, said process apparatus including means for serially transmitting on a single line of said binary interface an identification followed by a digital word of N bits representative of an analog value, said means for transmitting including means for transmitting each of the N bits of said digital word as a sequence comprising a first constant value having a period of at least X followed by a data bit having a period of at least 3X followed by a second constant value having a period of at least X; and an interface circuit including means for serially receiving from the process apparatus said identification followed by said digital word of N bits, said means for receiving including means for recognizing each of the N bits of said digital word as said sequence, and means for converting the N bits of said digital to said analog value.

6. A method for outputting an analog signal from a process apparatus having a binary interface, said process apparatus having a scan time X for changing output values at the binary interface, said method comprising steps of:

serially transmitting a signal from the process apparatus to an interface circuit, said signal including an identification followed by a digital word of N bits representative of an analog value, each of the N bits of said digital word comprising a sequence including a first constant value having a period of at least X followed by a data bit having a period of at least 3X followed by a second constant value having a period of at least X;

said interface circuit receiving said identification followed by said digital word of N bits, including recognizing said identification and the sequence of each of said N bits; and said interface circuit converting the N bits of said digital word to said analog value.

7. A method as defined in claim 6 wherein said digital word represents two or more analog signals and wherein the step of converting the N bits of said digital word includes converting the N bits of said digital word into said two or more analog signals.

8. An interface circuit for inputting an analog signal to process apparatus having a binary interface, comprising:

means for converting a value of the analog signal to a digital word comprising P pulses, where P is a number that represents the value of the analog signal; and means for serially transmitting to the process apparatus on a single line of the binary interface the P pulses of said digital word followed by an end indication, said process apparatus including means for counting pulses received at said binary interface.

9. An interface circuit as defined in claim 8 wherein the P pulses of said digital word transmitted to the process apparatus include a constant number of pulses and a variable number of pulses, said variable number of pulses representing the value of said analog signal.

10. An interface circuit as defined in claim 8 wherein said process apparatus has a scan time for sampling inputs at said binary interface and wherein said end indication comprises an off state having a period of at least 2X.

11. A system comprising:

process apparatus including a binary interface and means for counting pulses received at said binary interface; and an interface circuit including means for converting a value of an analog signal to a digital word comprising P pulses, where P is a number that represents the value of the analog signal, and means for serially transmitting to the process apparatus on a single line of the binary interface the P pulses of said digital word followed by an end indication.

12. An interface circuit for conversion of a signal transmitted serially by process apparatus having a binary interface, said signal including a digital word comprising P pulses, where P is a number that represents an analog value, followed by an end indication, said interface circuit comprising:

means for receiving the P pulses of said digital word followed by said end indication; and means for converting the P pulses of said digital word to said analog value.

13. A system comprising:

process apparatus including a binary interface, said process apparatus including means for serially transmitting on a single line of said binary interface a digital word comprising P pulses, where P is a number that represents an analog value, followed by an end indication; and an interface circuit including means for serially receiving from the process apparatus the P pulses of said digital word followed by said end indication, and means for converting the P pulses of said digital word to said analog value.

14. A method for inputting an analog signal to process apparatus having a binary interface, comprising the steps of:

in an interface circuit, converting a value of the analog signal to a digital word comprising P pulses, where P is a number that represents the value of the analog signal;

serially transmitting from the interface circuit to the process apparatus on a single line of the binary interface the P pulses of said digital word followed by an end indication; and said process apparatus counting the P pulses of said digital word to determine the value of said analog signal.

15. A method for outputting an analog signal from a process apparatus having a binary interface, comprising the steps of:

serially transmitting a signal from the process apparatus to an interface circuit on a single line of the binary interface, said signal including a digital word comprising P pulses, where P is a number that represents an analog value, followed by an end indication;

said interface circuit receiving the P pulses of said digital word followed by said end indication; and said interface circuit converting the P pulses of said digital word to said analog value.

16. An interface circuit for inputting an analog signal to process apparatus having a binary interface, comprising:

means for converting a value of the analog signal to a digital word of N bits; and means for serially transmitting to the process apparatus on a single line of the binary interface an identification followed by the N bits of said digital word, said process apparatus having a scan time X for sampling inputs at said binary interface and including means for counting pulses received at said binary interface, said means for transmitting including means for transmitting each of the N bits of said digital word as a sequence comprising a number of pulses representative of a binary state of the data bit followed by an off state having a period of at least 2X.

17. An interface circuit as defined in claim 16 wherein said sequence comprises one pulse representative of a first binary state or two pulses representative of a second binary state.

18. An interface circuit as defined in claim 16 wherein said identification comprises at least three pulses followed by an off state having a period of at least 2X.

19. An interface circuit as defined in claim 16 wherein said digital word represents two or more analog signals and wherein said means for converting includes means for time multiplexing bits representative of said two or more analog signals into said digital word.

20. A system comprising:

process apparatus including a binary interface, means for sampling inputs at said binary interface with a scan time X and means for counting pulses received at said binary interface; and an interface circuit including means for converting a value of an analog signal to a digital word of N bits and means for serially transmitting to the process apparatus on a single line of the binary interface an identification followed by the N bits of said digital word, said means for transmitting including means for transmitting each of the N bits of said digital word as a sequence comprising a number of pulses representative of a binary state of the data bit followed by an off state having a period of at least 2X.

21. A system as defined in claim 20 wherein said digital word represents two or more analog signals and wherein said means for converting comprises means for time multiplexing bits representative of said two or more analog signals into said digital word for transmission to the process apparatus.

22. An interface circuit for conversion of a signal transmitted serially by process apparatus having a binary interface, said signal including an identification followed by a digital word of N bits representative of an analog value, said process apparatus having a scan time X for changing output values at said binary interface, said interface circuit comprising:

means for receiving said identification pulse followed by said digital word of N bits, said means for receiving including means for recognizing each of the N bits of said digital word as a sequence comprising a number of pulses representative of a binary state of the data bit followed by an off state having a period of at least 2X; and means for converting the N bits of said digital word to said analog value.

23. A method for inputting an analog signal to process apparatus having a binary interface, said process apparatus having a scan time X for sampling inputs at said binary interface, said method comprising the steps of:

in an interface circuit, converting a value of the analog signal to a digital word of N bits;

serially transmitting from the interface circuit to the process apparatus on a single line of the binary interface an identification followed by the N bits of said digital word, including transmitting each of the N bits of said digital word as a sequence comprising a number of pulses representative of a binary state of the data bit followed by an off state having a period of at least 2X; and said process apparatus counting the pulses representative of the binary state of each data bit in said digital word to determine the value of said analog signal.

24. A method as defined in claim 23 wherein said digital word represents two or more analog signals and wherein the step of converting a value of the analog signal to a digital word includes time multiplexing bits representative of said two or more analog signals into said digital word for transmission to the process apparatus.

25. An interface circuit for inputting an analog signal to process apparatus having a binary interface, comprising:

means for determining a difference between a current value of the analog signal and a previous value of the analog signal;

means for converting the difference to a delta digital word of M bits when the difference is less than a threshold limit;

means for converting the current value of the analog signal to a full digital word of N bits when the difference is equal to or greater than said threshold limit; and means for transmitting to the process apparatus on a single line of the binary interface an identification followed by an indication of the delta digital word or the full digital word followed by the M bits of the delta digital word or the N bits of the full digital word.

26. An interface circuit as defined in claim 25 wherein said means for transmitting comprises means for transmitting the delta digital word or the full digital word representative of two or more analog signals.

27. A system comprising:

process apparatus including a binary interface and means for sampling inputs at said binary interface; and an interface circuit including means for determining a difference between a current value of an analog signal and a previous value of the analog signal, means for converting the difference to a delta digital word of M bits when the difference is less than a threshold limit, means for converting the current value of the analog signal to a full digital word of N bits when the difference is equal to or greater than the threshold limit, and means for transmitting to the process apparatus on a single line of the binary interface an identification followed by an indication of the delta digital word or the full digital word followed by the M bits of the delta digital word or the N bits of the full digital word, said process apparatus including means responsive to an indication of the delta digital word for adding said delta digital word to the previous value of the analog signal to determine the current value of the analog signal and means responsive to an indication of the full digital word for processing the N bits of the full digital word as representative of the current value of the analog signal.

28. A method for inputting an analog signal to process apparatus having a binary interface, comprising the steps of:

in an interface circuit, determining a difference between a current value of the analog signal and a previous value of the analog signal;

in said interface circuit, converting the difference to a delta digital word of M bits when the difference is less than a threshold limit;

in said interface circuit, converting the current value of the analog signal to a full digital word of N bits when the difference is equal to or greater than said threshold limit;

transmitting from said interface circuit to the process apparatus on a single line of the binary interface an identification followed by an indication of the delta digital word or the full digital word followed by the M bits of the delta digital word or the N bits of the full digital word; and said process apparatus adding the difference represented by the M bits of the delta digital word to the previous value of the analog signal to determine the current value of the analog signal in response to said indication of the delta digital word and processing the N bits of the full digital word as representative of the current value of the analog signal in response to said indication of the full digital word.

29. A method as defined in claim 28 wherein the step of transmitting includes transmitting the delta digital word or the full digital word representative of two or more analog signals.

30. A system comprising:

process apparatus including a binary interface, said process apparatus including means for determining a difference between a current value of an analog signal and a previous value of the analog signal, means for converting the difference to a delta digital word of M bits when the difference is less than a threshold limit, means for converting the current value of the analog signal to a full digital word of N bits when the difference is equal to or greater than said threshold limit and means for serially transmitting on a single line of said binary interface an identification followed by an indication of the delta digital word or the full digital word followed by the M bits of the delta digital word or the N bits of the full digital word; and an interface circuit including means for serially receiving from the process apparatus said identification followed by said indication of the delta digital word or the full digital word followed by the M bits of the delta digital word or the N bits of the full digital word, said interface circuit further including means for adding the difference represented by the M bits of the delta digital word to the previous value of the analog signal to determine the current value of the analog signal in response to said indication of the delta digital word and means for processing the N bits of the full digital word as representative of the current value of the analog signal in response to said indication of the full digital word.

31. A method for outputting an analog signal from a process apparatus having a binary interface, comprising the steps of:

in said process apparatus, determining a difference between a current value of the analog signal and a previous value of the analog signal;

in said process apparatus, converting the difference to a delta digital word of M bits when the difference is less than a threshold limit;

in said process apparatus, converting the current value of the analog signal to a full digital word of N bits when the difference is equal to or greater than said threshold limit;

transmitting from said process apparatus to an interface circuit on a single line of the binary interface an identification followed by an indication of the delta digital word or the full digital word followed by the M bits of the delta digital word or the N bits of the full digital word; and said interface circuit adding the difference represented by the M bits of the delta digital word to the previous value of the analog signal to determine the current value of the analog signal in response to said indication of the delta digital word and processing the N bits of the full digital word as representative of the current value of the analog signal in response to said indication of the full digital word.

32. A method as defined in claim 31 wherein the step of transmitting includes transmitting the delta digital word or the full digital word representative of two or more analog signals.

* * * * *